US010798865B2

(12) United States Patent
Fast et al.

(10) Patent No.: US 10,798,865 B2
(45) Date of Patent: Oct. 13, 2020

(54) AGRICULTURAL IMPLEMENT WITH LIFT ASSIST AND UPLIFT CAPABILITY

(71) Applicant: FAST GLOBAL SOLUTIONS, Glenwood, MN (US)

(72) Inventors: Verlyn Keith Fast, Bingham Lake, MN (US); John H. Hoeper, Alexandria, MN (US); Clay Roll, Bingham Lake, MN (US); James Bruce Prohaska, Prior Lake, MN (US); Kurt Mitchell Forth, Cologne, MN (US)

(73) Assignee: FAST Global Solutions Inc., Glenwood, MN (US)

( * ) Notice: Subject to any disclaimer, the term of this patent is extended or adjusted under 35 U.S.C. 154(b) by 230 days.

(21) Appl. No.: 16/070,196

(22) PCT Filed: Jan. 19, 2017

(86) PCT No.: PCT/US2017/014094
§ 371 (c)(1),
(2) Date: Jul. 13, 2018

(87) PCT Pub. No.: WO2017/127518
PCT Pub. Date: Jul. 27, 2017

(65) Prior Publication Data
US 2019/0021210 A1 Jan. 24, 2019

Related U.S. Application Data

(60) Provisional application No. 62/300,561, filed on Feb. 26, 2016, provisional application No. 62/280,588, filed on Jan. 19, 2016.

(51) Int. Cl.
A01B 63/32 (2006.01)
A01C 7/20 (2006.01)
(Continued)

(52) U.S. Cl.
CPC .............. *A01B 63/32* (2013.01); *A01B 59/04* (2013.01); *A01B 73/044* (2013.01);
(Continued)

(58) Field of Classification Search
CPC ......... A01B 63/32; A01B 63/24; A01B 63/14; A01B 63/00; A01B 59/04; A01B 59/00;
(Continued)

(56) References Cited

U.S. PATENT DOCUMENTS 2,972,385 A 2/1961 Walberg
3,422,909 A 1/1969 Jacobs
(Continued)

FOREIGN PATENT DOCUMENTS

WO WO 2013090826 6/2013

Primary Examiner — Christopher J. Novosad
(74) Attorney, Agent, or Firm — Christensen, Fonder, Dardi & Herbert PLLC

(57) ABSTRACT

A tool bar and hydraulic system for a large scale agricultural implement. The tool bar includes opposed pivotable wings that are extended in a field configuration and retracted in a transport configuration. In some embodiments, each pivotable wing includes two lift assist assemblies for aiding in the execution of turns in the field, and for aiding in the transport of the agricultural implement. The tool bar may be configured to compensate for twist of the pivotable wings when in the transport configuration. The hydraulic system is configured to stiffen the tool bar assembly for lift assist during field operation and to flex the tool bar into a folded configuration for transport.

18 Claims, 18 Drawing Sheets

(51) Int. Cl.
*A01B 73/06* (2006.01)
*A01B 59/04* (2006.01)
*A01B 73/04* (2006.01)
*A01C 23/00* (2006.01)

(52) U.S. Cl.
CPC ............ *A01B 73/067* (2013.01); *A01C 7/208* (2013.01); *A01C 23/008* (2013.01)

(58) Field of Classification Search
CPC ....... A01B 73/044; A01B 73/04; A01B 73/02; A01B 73/00; A01B 73/067; A01B 73/06; A01C 7/208; A01C 7/20; A01C 7/00; A01C 23/008; A01C 23/00
See application file for complete search history.

(56) References Cited

U.S. PATENT DOCUMENTS

| | | |
|---|---|---|
| 3,620,550 A | 11/1971 | Hornung |
| 3,844,358 A | 10/1974 | Shuler et al. |
| 4,030,551 A | 6/1977 | Boetto et al. |
| 4,191,260 A | 3/1980 | Klindworth |
| 4,320,805 A | 3/1982 | Winter |
| 4,867,245 A | 9/1989 | Stevens |
| 4,896,732 A | 1/1990 | Stark |
| 5,113,956 A | 5/1992 | Friesen et al. |
| 5,232,054 A | 8/1993 | Van Blaricon et al. |
| 5,488,996 A | 2/1996 | Barry et al. |
| 5,577,563 A | 11/1996 | Holen |
| 5,579,849 A | 12/1996 | Houck |
| 5,641,026 A | 6/1997 | Balmer |
| 5,647,440 A | 7/1997 | Barry et al. |
| 5,715,893 A | 2/1998 | Houck |
| 5,787,988 A | 8/1998 | Harlan et al. |
| 5,829,370 A | 11/1998 | Bender |
| 5,839,516 A | 11/1998 | Arnold et al. |
| 5,934,382 A | 8/1999 | Wilkins |
| 6,035,942 A | 3/2000 | Smith et al. |
| 6,076,613 A | 6/2000 | Frasier |
| 6,092,609 A | 7/2000 | Jeffery et al. |
| 6,112,827 A | 9/2000 | Reiber et al. |
| 6,131,669 A | 10/2000 | Friggstad et al. |
| 6,167,972 B1 | 1/2001 | Hundeby et al. |
| 6,189,465 B1 | 2/2001 | Burns et al. |
| 6,192,994 B1 | 2/2001 | Friggstad et al. |
| 6,202,756 B1 | 3/2001 | Hundeby et al. |
| 6,206,105 B1 | 3/2001 | Friesen |
| 6,220,366 B1 | 4/2001 | Noonan et al. |
| 6,269,887 B1 | 8/2001 | Friggstad |
| 6,293,352 B1 | 9/2001 | Hundeby et al. |
| 6,305,478 B1 | 10/2001 | Friggstad |
| 6,367,562 B1 | 4/2002 | Mosdal |
| 6,374,921 B1 | 4/2002 | Friggstad |
| 6,374,922 B1 | 4/2002 | Friggstad |
| 6,374,923 B1 | 4/2002 | Friggstad |
| 6,415,873 B1 | 7/2002 | Hudgins |
| 6,550,543 B1 | 4/2003 | Friggstad |
| 6,561,283 B2 | 5/2003 | Hundeby |
| 6,609,574 B1 | 8/2003 | Collins |
| 6,684,962 B1 | 2/2004 | Lewallen |
| 6,761,228 B2 | 7/2004 | Dobson et al. |
| 7,021,394 B2 | 4/2006 | Marchesan |
| 7,073,604 B1 | 7/2006 | Dobson et al. |
| 7,204,319 B2 | 4/2007 | Hoehn et al. |
| 7,469,648 B2 | 12/2008 | Bettin |
| 7,478,683 B2 | 1/2009 | Peck et al. |
| 7,497,269 B2 | 3/2009 | Jagow |
| 7,562,719 B1 | 7/2009 | Misenhelder et al. |
| 7,581,597 B2 | 9/2009 | Neudorf et al. |
| 7,849,933 B2 | 12/2010 | Marggi |
| 7,854,271 B2 | 12/2010 | Naylor et al. |
| 7,854,272 B2 | 12/2010 | Friggstad et al. |
| 7,921,932 B2 | 4/2011 | Poole |
| 7,984,767 B2 | 7/2011 | Friggstad et al. |
| 8,011,439 B2 | 9/2011 | Gadzella et al. |
| 8,122,970 B2 | 2/2012 | Palen |
| 8,127,861 B2 | 3/2012 | Meek |
| 8,141,653 B2 | 3/2012 | Ryder et al. |
| 8,186,449 B2 | 5/2012 | Hackert et al. |
| 8,215,413 B2 | 7/2012 | Friggstad |
| 8,235,133 B2 | 8/2012 | Friggstad |
| 8,291,994 B2 | 10/2012 | Hulicsko |
| 8,342,256 B2 | 1/2013 | Adams et al. |
| 8,408,326 B2 | 4/2013 | Yuen et al. |
| 8,468,655 B2 | 6/2013 | Borkgren et al. |
| 8,505,645 B1 | 8/2013 | Kelly et al. |
| 8,770,309 B2 | 7/2014 | Bauer |
| 8,776,908 B2 | 7/2014 | Maro et al. |
| 8,813,864 B2 | 8/2014 | Layton |
| 8,820,428 B2 | 9/2014 | McCrea et al. |
| 8,820,429 B2 | 9/2014 | Knobloch et al. |
| 8,833,481 B2 | 9/2014 | Blunier et al. |
| 8,863,488 B2 | 10/2014 | Dow et al. |
| 8,868,303 B2 | 10/2014 | Tuttle et al. |
| 8,869,909 B2 | 10/2014 | Blunier et al. |
| 8,893,816 B2 | 11/2014 | Maro et al. |
| 8,909,435 B2 | 12/2014 | Tuttle et al. |
| 8,960,321 B2 | 2/2015 | Tamm |
| 9,010,451 B2 | 4/2015 | Dames et al. |
| 9,148,987 B2 | 10/2015 | Baker |
| 9,198,342 B2 | 12/2015 | Friggstad |
| 2005/0087350 A1 | 4/2005 | Bauer |
| 2007/0169950 A1 | 7/2007 | Grieshop |
| 2008/0314605 A1 | 12/2008 | Degelman et al. |
| 2014/0034342 A1 | 2/2014 | Friggstad |
| 2015/0127230 A1 | 5/2015 | Blunier et al. |
| 2015/0271981 A1 | 10/2015 | Degelman |

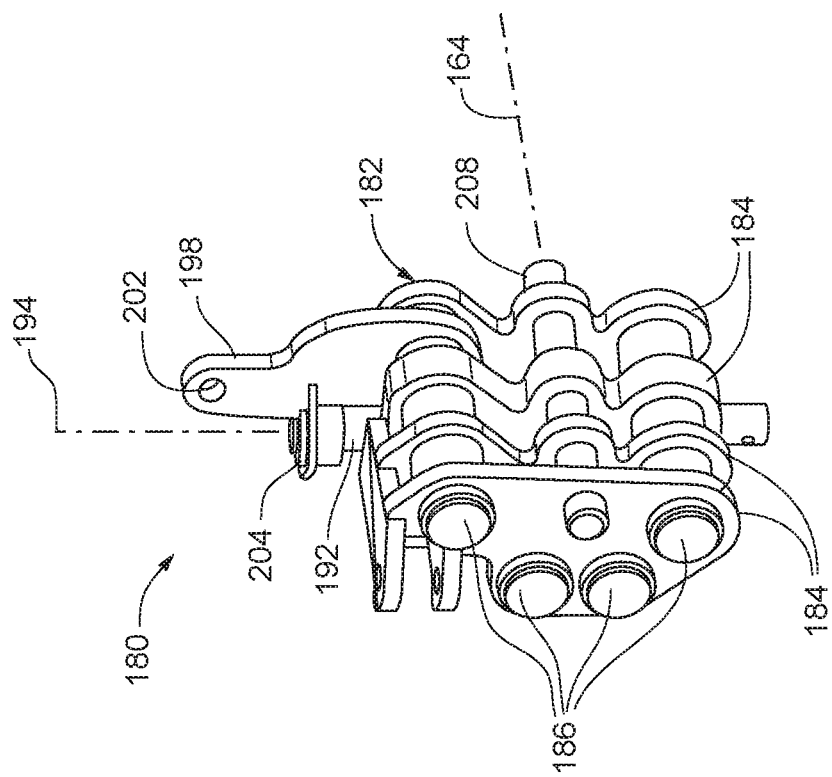
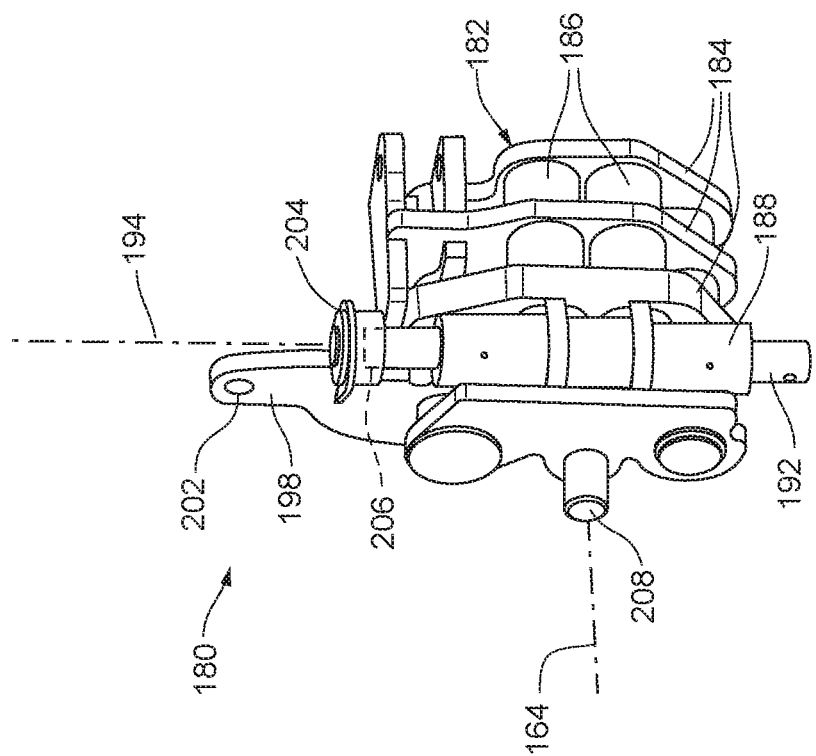

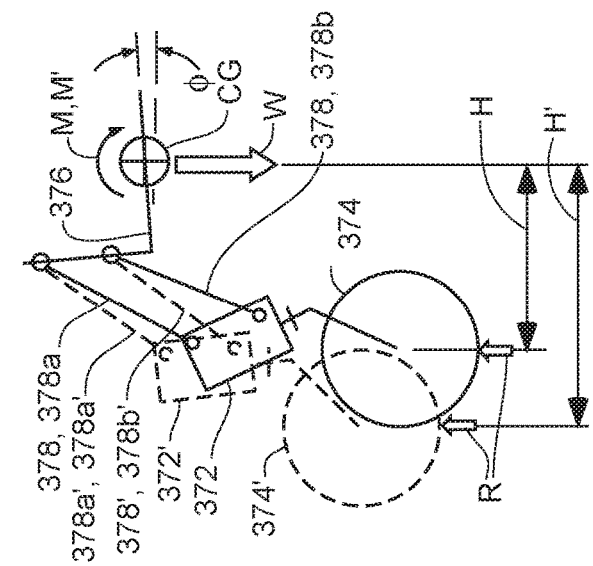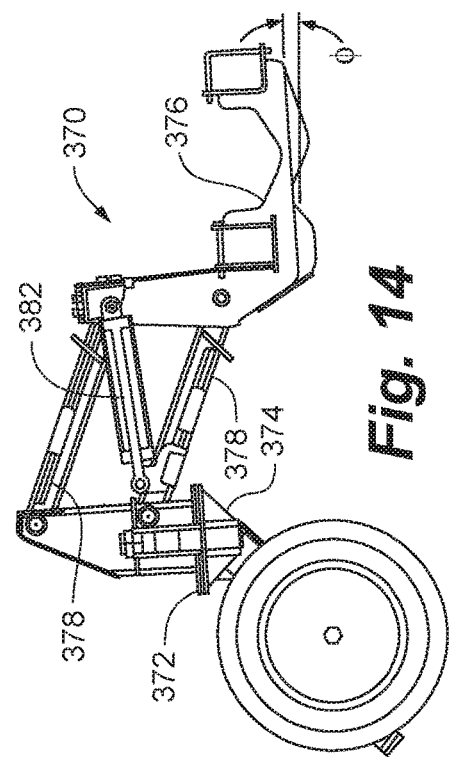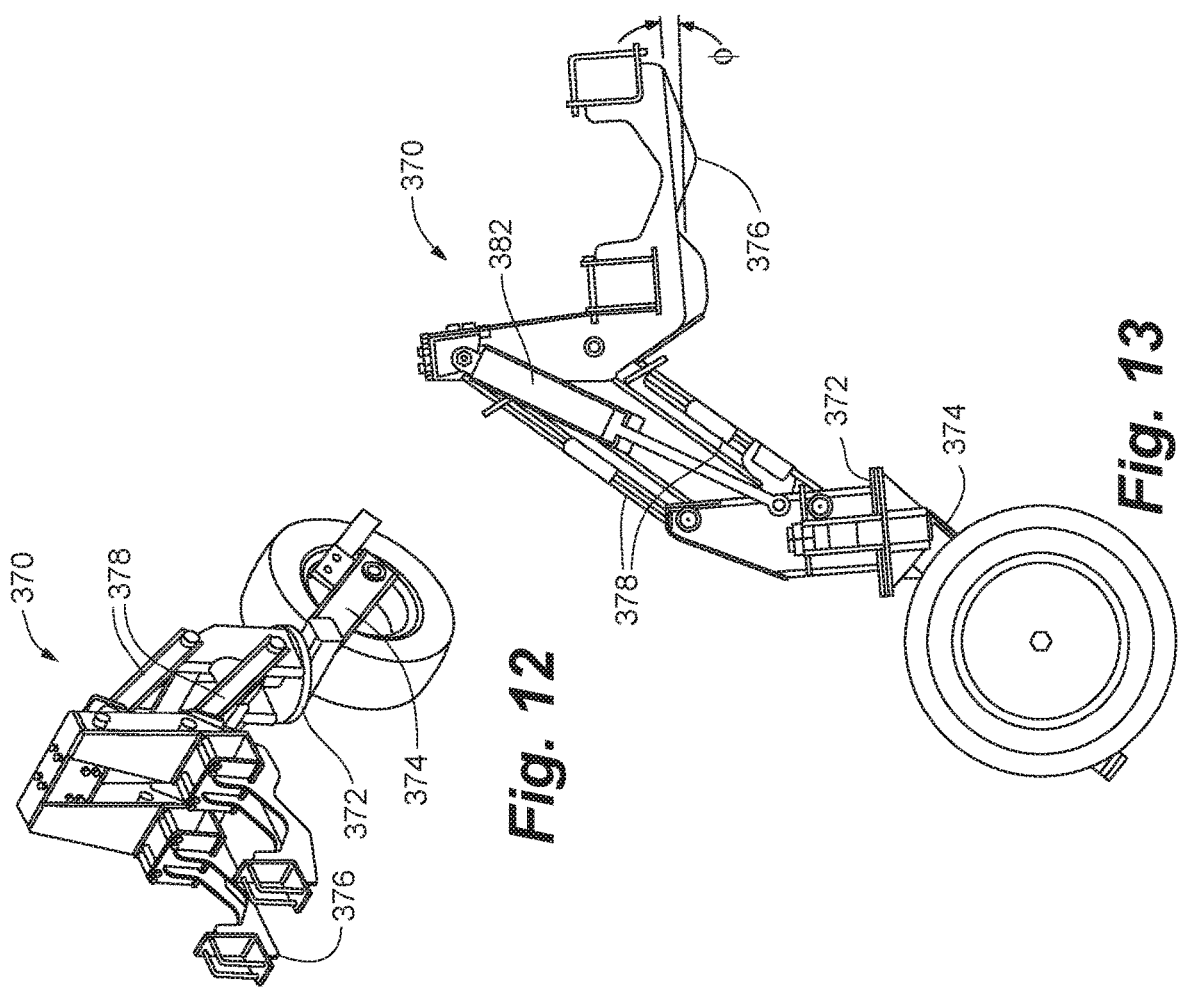

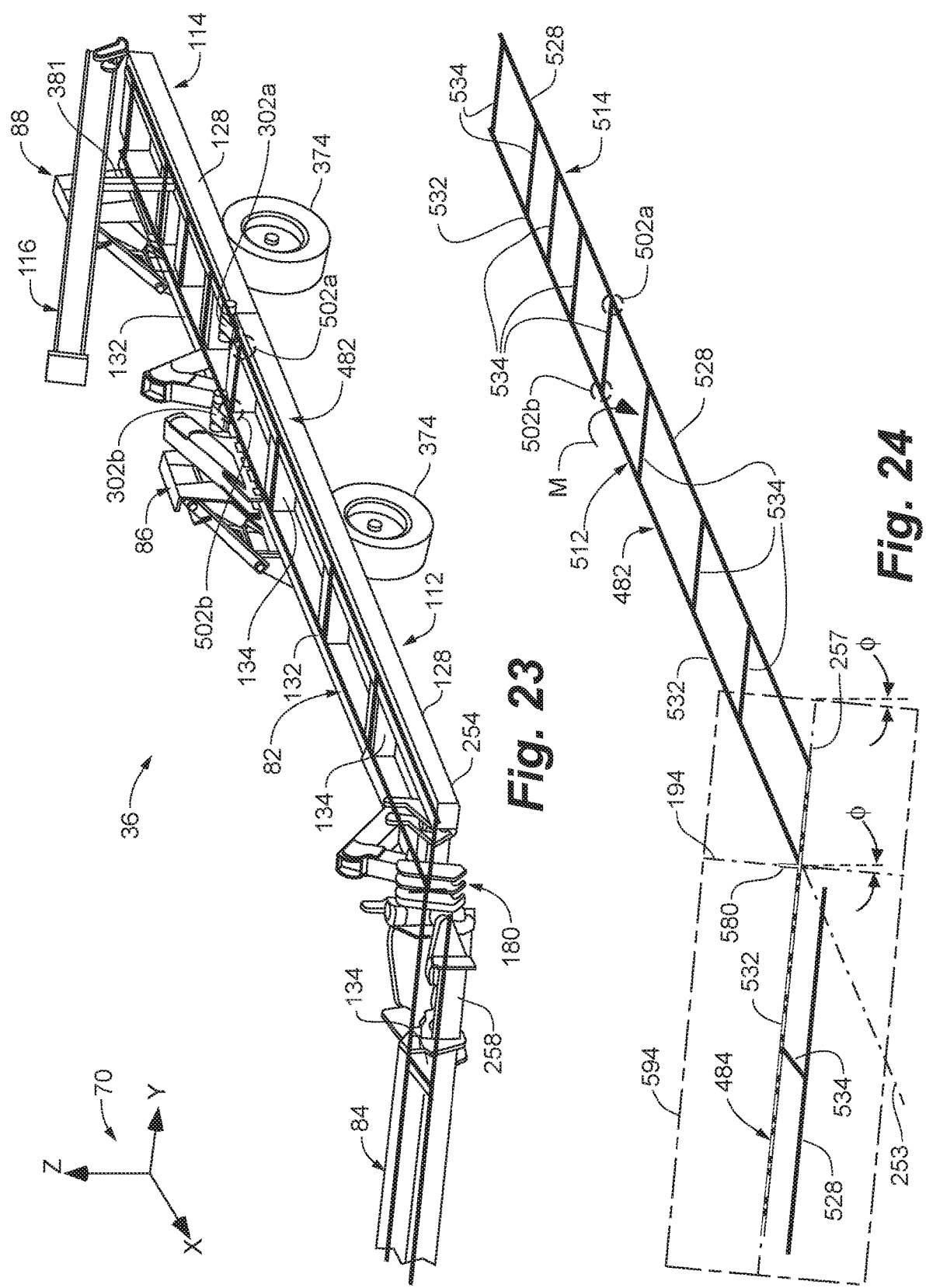

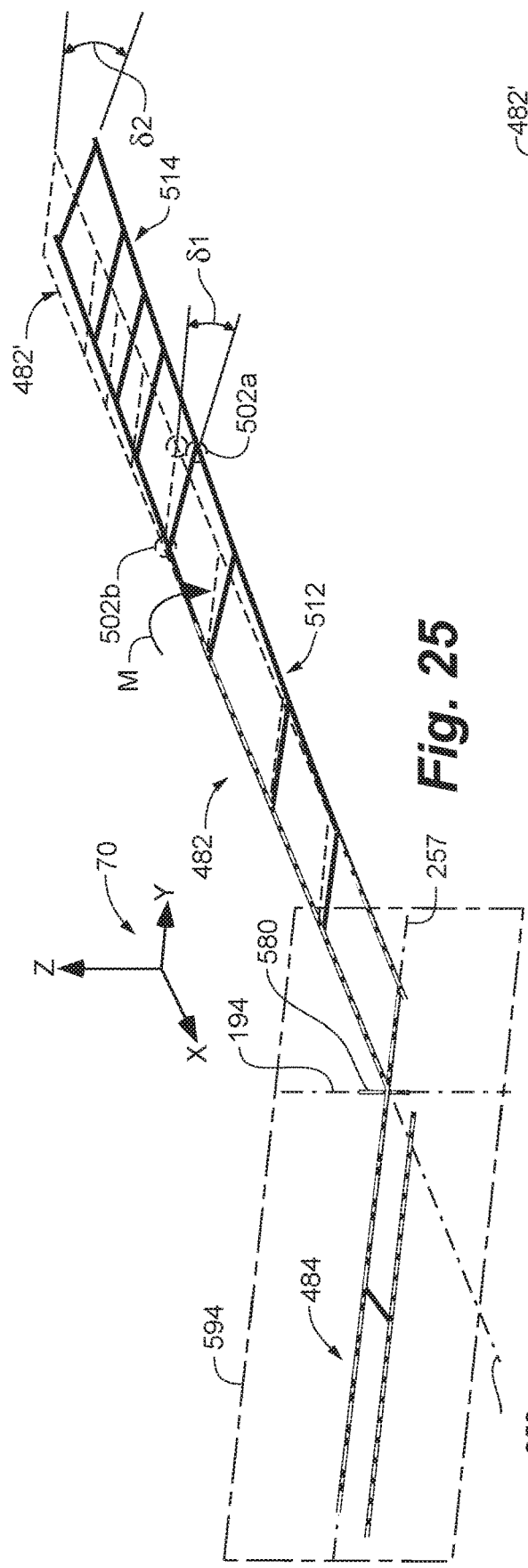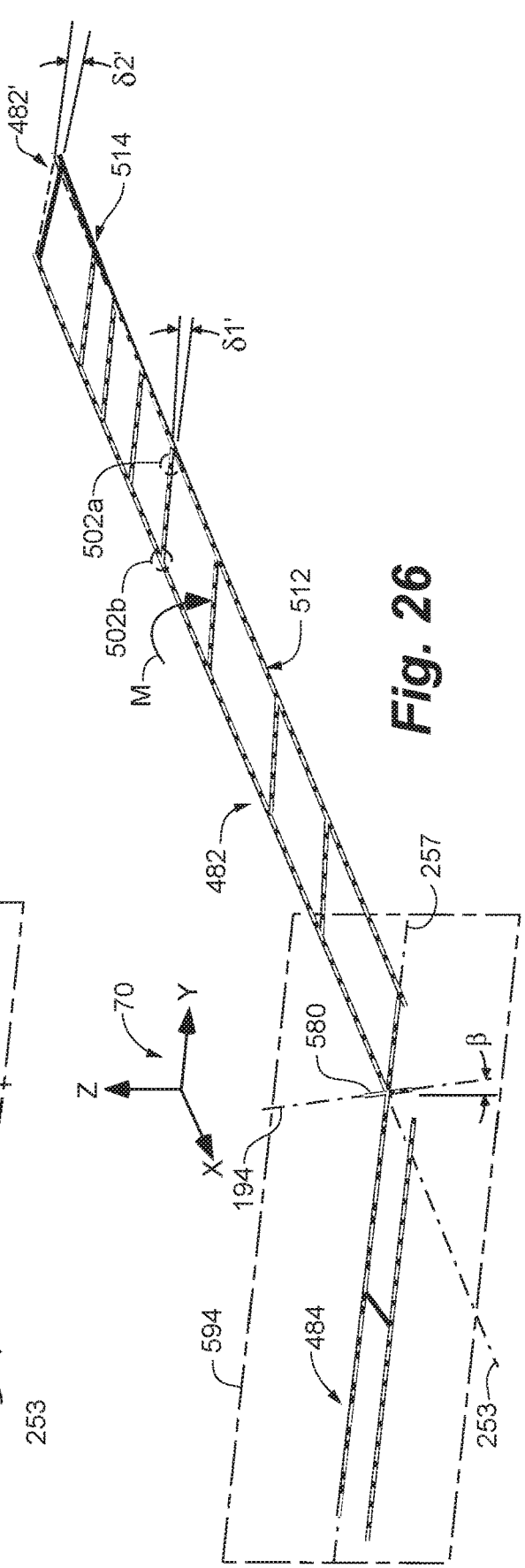

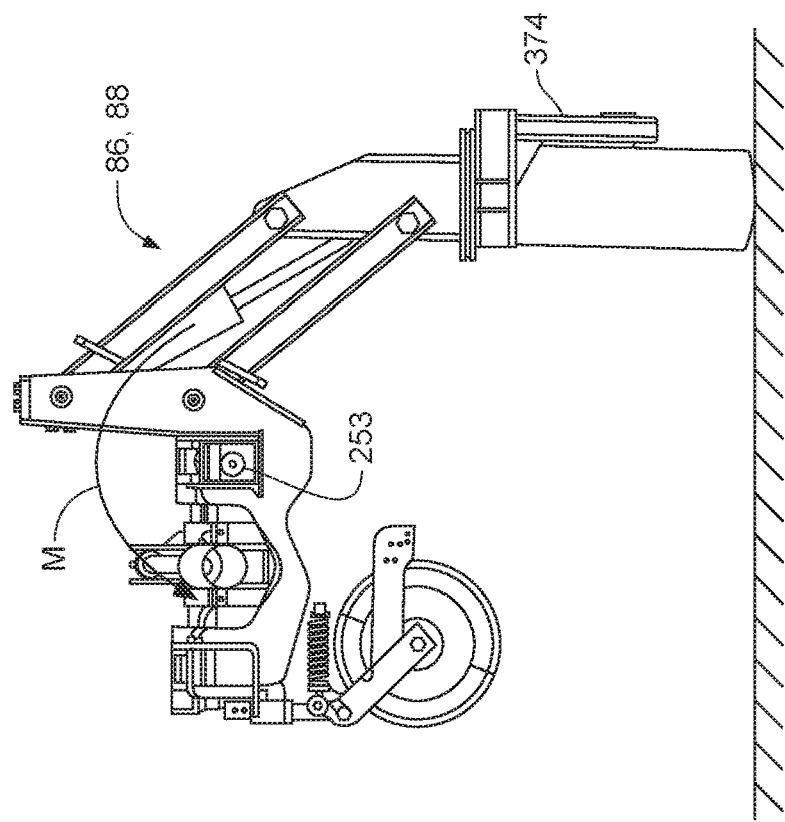
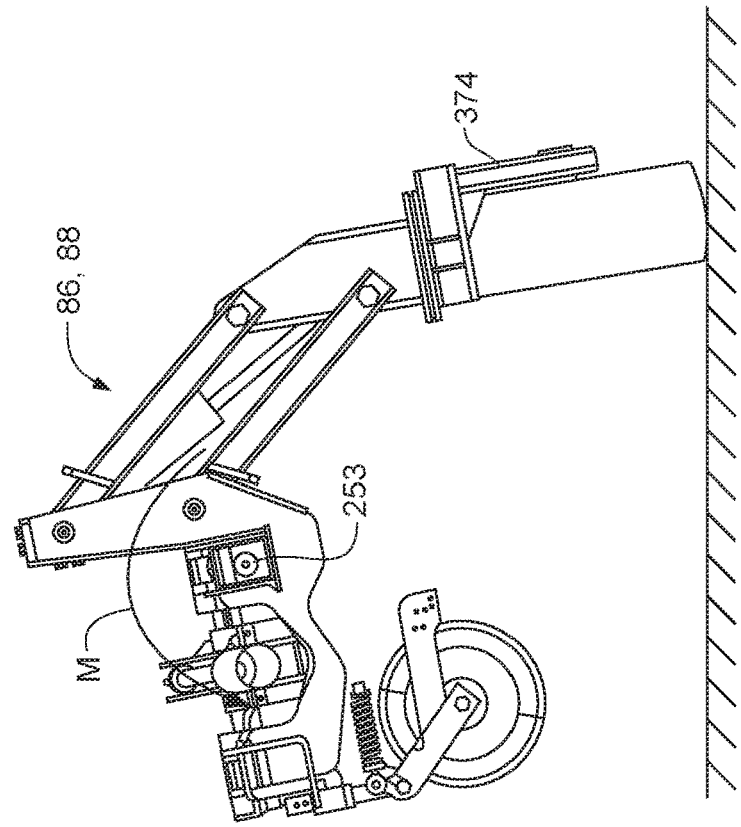

AGRICULTURAL IMPLEMENT WITH LIFT ASSIST AND UPLIFT CAPABILITY

RELATED APPLICATIONS

The present application is a National Phase entry of PCT Application No. PCT/US2017/014094, filed Jan. 19, 2017, 2016, which claims the benefit of U.S. Patent Provisional Patent Application No. 62/280,588 filed Jan. 19, 2016, and U.S. Patent Provisional Patent Application No. 61/300,561, filed Feb. 26, 2016, the disclosures of which are incorporated by reference herein in their entirety.

FIELD OF THE DISCLOSURE

The disclosure is directed to farm implements, and more specifically to fertilizer applicators with folding tool bars.

BACKGROUND

Agricultural implements that utilize folding toolbars, such as fertilizer applicators, continue to be developed with increasing wing span. For example, the FAST® 8300 Series Applicator, manufactured by the owner of the present application, features a tool bar having a wingspan of just over 13 meters (44 feet). The FAST® 8200 Series Applicator features a rearward folding tool bar having a wingspan of about 20 meters (66 feet). The FAST® 8400 Series Applicator features a rearward folding tool bar with mid-span lift assist capability and having a wingspan of over 27 meters (90 feet).

The demand for increasing the wingspans of tool bars on farm implements continues. As wingspans increase, challenges arise that preclude merely scaling up existing tool bar designs. Improved designs that accommodate increasing tool bar dimensions would be welcomed.

SUMMARY

Various embodiments of the disclosure are suitable for folding tool bars of increasingly large wingspans. Design challenges that are encountered for folding tool bars of increased wingspan contemplated include how to configure larger systems for acceptable deflectional distortions to the tool bar, both in an extended (i.e. "field") configuration and in a retracted (i.e., "transport") configuration.

Some embodiments are suitable for implementation of a wing spans of over 36 meters (120 feet) and beyond. In some embodiments, each folding wing is equipped with an enhanced lift assist capability that aids in executing turns in the field, and also reduces the amount and complexity of folding of the implement in the transport configuration. In some embodiments, the tool bar assembly can be flexible while exerting down forces for ground tool engagement during terrain engagement, "stiffened" during lift assist operation for executing turns in the field, and again be flexible during lift assist operation during transport. Additional complexities of actuation systems (e.g., hydraulic system) to accommodate these aspects are also addressed to assure coordinated operation of the lift assist and wing actuation components. In some embodiments, the pivoting wings of the tool bar compensate for twisting of the pivotable wings when in the transport configuration.

Structurally, a tool bar assembly for an agricultural implement is disclosed that is configurable in a field configuration and a transport configuration, the tool bar comprising a center section defining a lateral axis that is perpendicular to a towing direction of the agricultural implement, an inner wing section including a proximal end and a distal end, and a mid wing section including a proximal end and a distal end. A first hinge assembly bridges the center section and the proximal end of the inner wing section, the first hinge assembly defining a first hinge axis that is substantially horizontal in the field configuration. A second hinge assembly that bridges the distal end of the inner wing section and the proximal end of the mid wing section, the second hinge assembly defining a second hinge axis that is substantially horizontal in the field configuration. In various embodiments, a first lift assist assembly and a second lift assist assembly support the tool bar assembly proximate opposing ends of the mid wing section, each configured to vertically displace the mid wing section. The first lift assist assembly may be an inner lift assist assembly that supports the tool bar assembly proximate the distal end of the inner wing section, and the second lift assist assembly may be an outer lift assist assembly that supports the tool bar assembly proximate a distal end of the mid wing section. The first lift assist assembly includes a first hydraulic lift assist actuator defining a base end chamber and the second lift assist assembly includes a second hydraulic lift assist actuator defining a ram end chamber, the base end chamber being in fluid communication with the ram end chamber.

In some embodiments, an effective area of the base end chamber is equal to an effective area of the ram end chamber. In some embodiments, the center section and the inner wing section are configured to limit downward rotation of the inner wing section relative to the center section about the first hinge axis within a range of rotation not to exceed 20 degrees with respect to a nominal rotational orientation about the first hinge axis. Also, the inner wing section and the mid wing section may be configured to limit downward rotation of the mid wing section relative to the inner wing section about the second hinge axis within a range of rotation not to exceed 20 degrees with respect to a nominal rotational orientation about the second hinge axis.

In various embodiments of the disclosure, a first lateral actuator that bridges the center section and the proximal end of the inner wing section for articulation of the inner wing section relative to the center section about the first hinge axis, the first lateral actuator being configured to selectively exert an up force on the inner wing section relative to the center section and about the first hinge axis to stiffen the tool bar assembly. A second lateral actuator may also bridge the distal end of the inner wing section and the proximal end of the mid wing section for articulation of the mid wing section relative to the inner wing section about the second hinge axis, the second lateral actuator being configured to selectively exert an up force on the mid wing section relative to the inner wing section and about the second hinge axis to stiffen the tool bar assembly. In some embodiments, the first lateral actuator is a dual action actuator. In some embodiments, the second lateral actuator is a dual action actuator.

In various embodiments of the disclosure, the center section includes a pivot assembly mounted proximate the proximal end of the inner wing section, the pivot assembly defining a pivot axis lying in a first plane that is substantially orthogonal to the towing direction of the agricultural implement, the inner wing section being rotatable relative to the center section and about the pivot axis for rotation of the inner wing section into a plane that is substantially parallel to the towing direction of the agricultural implement. The first hinge assembly may be rotatable about the pivot axis of the pivot assembly. In some embodiments, the pivot axis is canted at an angle with respect to a vertical upward direction to slope toward a centerline of the center section in an upward direction. In some embodiments, the angle is within a range of 1 degree to 10 degrees inclusive. The second hinge assembly may comprise two hinges with concentric hinge axes.

In some embodiments of the disclosure, an outer wing section includes a proximal end and a distal end. A third hinge assembly that bridges the proximal end of the outer wing section and the distal end of the mid wing section, the third hinge assembly defining a third hinge axis that is substantially horizontal in the field configuration, the mid wing section and the outer wing section being configured for rotation of the outer wing section relative to the mid wing section about the first hinge axis in a range of rotation that does not exceed 20 degrees in a downward direction and 170 degrees in an upward direction from a nominal rotational orientation. A third lateral actuator may bridge the distal end of the mid wing section and the proximal end of the outer wing section for articulation of the outer wing section relative to the mid wing section about the third hinge axis. The third lateral actuator may be a double acting actuator. The third lateral actuator may be a hydraulic actuator. Also, the third hinge assembly may comprise two hinges with concentric hinge axes.

In some embodiments, an upward rotation of said inner wing section about said center section is limited by an upper reach of the first lift assist assembly. Also, an upward rotation of said mid wing section relative to said inner wing section may be limited by an upper reach of the second lift assist assembly. In some embodiments, the first hydraulic lift assist actuator and the second hydraulic lift assist actuator are dual acting. Also, some embodiments comprise means for rephasing the dual acting hydraulic actuators of the first lift assist assembly and the second lift assist assembly.

In various embodiments of the disclosure, a tool bar assembly for an agricultural implement is configurable in a field configuration and a transport configuration, the tool bar assembly comprising a center section defining a lateral axis that is perpendicular to a towing direction of the agricultural implement, a pivot assembly mounted to the center section and defining a canted pivot axis that is canted at an angle with respect to a vertical upward direction to slope toward a centerline of the center section in the vertical upward direction, the centerline being parallel to a direction of travel of the agricultural implement, and a foldable wing pivotally mounted to the pivot assembly for rotation of the foldable wing about the canted pivot axis from the field configuration into the transport configuration, the foldable wing defining a longitudinal axis that extends parallel to the lateral axis of the center section when in the field configuration and that extends rearward of the center section when in the transport configuration, the longitudinal axis being defined as intersecting the canted pivot axis. Rotation of the foldable wing about the canted pivot axis causes the foldable wing to rotate about the longitudinal axis. The foldable wing may comprises a first wing section including a proximal end and a distal end, the first wing section extending along the longitudinal axis, the proximal end being pivotally mounted to the pivot assembly, a first hinge assembly that bridges the pivot assembly and the proximal end of the first wing section, the first hinge assembly defining a first hinge axis that is substantially horizontal in the field configuration and canted relative to horizontal in the transport configuration a second wing section including a proximal end and a distal end, the second wing section extending along the longitudinal axis, a second hinge assembly that bridges the distal end of the first wing section and the proximal end of the second wing section, the second hinge assembly defining a second hinge axis that is substantially horizontal in the field configuration and canted relative to horizontal in the transport configuration, the second wing section extending along the longitudinal axis of the first wing section. In some embodiments, the angle may be in a range of 1 degree to 10 degrees inclusive; in some embodiments, within a range of 2 degrees to 8 degrees inclusive; in some embodiments, within a range of 2 degrees to 5 degrees inclusive.

In various embodiments of the disclosure, a method for reducing a load supported by lift assist assemblies of a tool bar assembly is disclosed, the tool bar assembly including a center section that is perpendicular to a towing direction of the toolbar assembly, a first wing section having a proximal end coupled to the center section for rotation about a first hinge axis, a second wing section having a proximal end coupled to a distal end of the first wing section for rotation about a second hinge axis, a first lift assist assembly disposed proximate the distal end of the first wing section and contacting a ground surface in support of the tool bar assembly, and a second lift assist assembly disposed proximate the distal end of the second wing section and contacting the ground surface in support of the tool bar assembly. Various embodiments of the method include applying a first moment about the first hinge axis that causes a first upward force to be applied to the first lift assist assembly, and applying a second moment about the second hinge axis that causes a second upward force to be applied to the second lift assist assembly. A load supported by the first lift assist assembly and the second lift assist assembly is reduced by applying the first moment and the second moment, and the first lift assist assembly and the second lift assist assembly remain in contact with the ground surface after applying the first moment and the second moment.

In various embodiments of the disclosure, a hydraulic system for a tool bar assembly of an agricultural implement that is configurable in a field down force configuration, a field lift assist configuration, and a transport configuration, the hydraulic system comprising a first lateral hydraulic actuator defining a first base end chamber and a first ram end chamber, a first base end accumulator coupled to the first base end chamber of the first lateral hydraulic actuator, a first ram end accumulator coupled to the first ram end chamber of the first lateral hydraulic actuator, a second lateral hydraulic actuator defining a second base end chamber and a second ram end chamber, and a rerouting valve in fluid communication with the first base end chamber, the first ram end chamber, the second base end chamber, and the second ram end chamber. In the field down force configuration, the second ram end chamber of the second lateral hydraulic actuator is coupled with the first base end chamber of the first lateral hydraulic actuator and the first base end accumulator via the rerouting valve, the second base end chamber being in fluid communication with a hydraulic pressurization line, the first ram end chamber being in fluid communication with a return line. In the field lift assist configuration and the transport configuration, the second ram end chamber of the second lateral hydraulic actuator is coupled with the first ram end chamber of the first lateral hydraulic actuator and the first ram end accumulator via the rerouting valve, the first ram end chamber being in fluid communication with the hydraulic pressurization line, the second ram end chamber being in fluid communication with the hydraulic pressurization line via the rerouting valve, the first base end chamber and the second base end chamber being in fluid communication with the return line. In some embodiments, a second base end accumulator is coupled to the first base end chamber of the first lateral hydraulic actuator.

In various embodiments of the disclosure, a method of operating the hydraulic system is disclosed, comprising configuring the hydraulic system in the field down force configuration; and placing the pressurization line in fluid communication with a hydraulic pressure source to pressurize the second base end chamber of the second lateral hydraulic actuator. The pressurizing of the second base end chamber causes displacement of hydraulic fluid from the second ram end chamber to pressurize the first ram end chamber of the first lateral hydraulic actuator. The pressurizing of the first base end chamber causes displacement of hydraulic fluid from the first ram end chamber to displace fluid in the return line.

In various embodiments of the disclosure, a method of operating the hydraulic system is disclosed, configuring the hydraulic system in the field lift assist configuration, and placing the pressurization line in fluid communication with a hydraulic pressure source to pressurize the first ram end chamber of the first lateral hydraulic actuator and the second ram end chamber of the second lateral hydraulic actuator, the second ram end chamber being pressurized via the rerouting valve. The pressurizing of the first ram end chamber and the second ram end chamber causes displacement of hydraulic fluid from the first base end chamber and the second base end chamber, respectively, to displace fluid in the return line.

In various embodiments of the disclosure, a method of operating the hydraulic system is disclosed, closing the pressurization line and the return line after the step of placing the pressurization line in fluid communication with the hydraulic pressure source, thereby configuring the hydraulic system in the transport configuration.

BRIEF DESCRIPTION OF THE DRAWINGS

FIGS. 5 and 6 are perspective views of a pivot assembly in an embodiment of the disclosure;

FIGS. 12 through 14 are views of a lift assist assembly while the agricultural implement in the extended configuration in an embodiment of the disclosure;

FIG. 23 is a perspective view of a tool bar assembly in the transport configuration, the tool bar assembly being partially assembled and with a vertical pivot axis, with a wire frame schematic overlaid thereon in an embodiment of the disclosure;

FIG. 24 depicts the wire frame schematic of FIG. 23 in isolation;

FIG. 25 depicts the twist of the wire frame schematic of FIG. 24 under normal load conditions with a vertical pivot axis in an embodiment of the disclosure;

FIG. 26 depicts the twist of the wire frame schematic of FIG. 24 but with a canted pivot axis as provided by the angled hinge bracket of FIG. 22 in an embodiment of the disclosure;

FIG. 27 is an elevational view of a lift assist assembly mounted to the tool bar assembly under the twisting action of FIG. 25 in an embodiment of the disclosure; and FIG. 28 is an elevational view of a lift assist assembly mounted to the tool bar assembly under the twisting action of FIG. 26 in an embodiment of the disclosure.

DETAILED DESCRIPTION OF THE FIGURES

Figure 1:
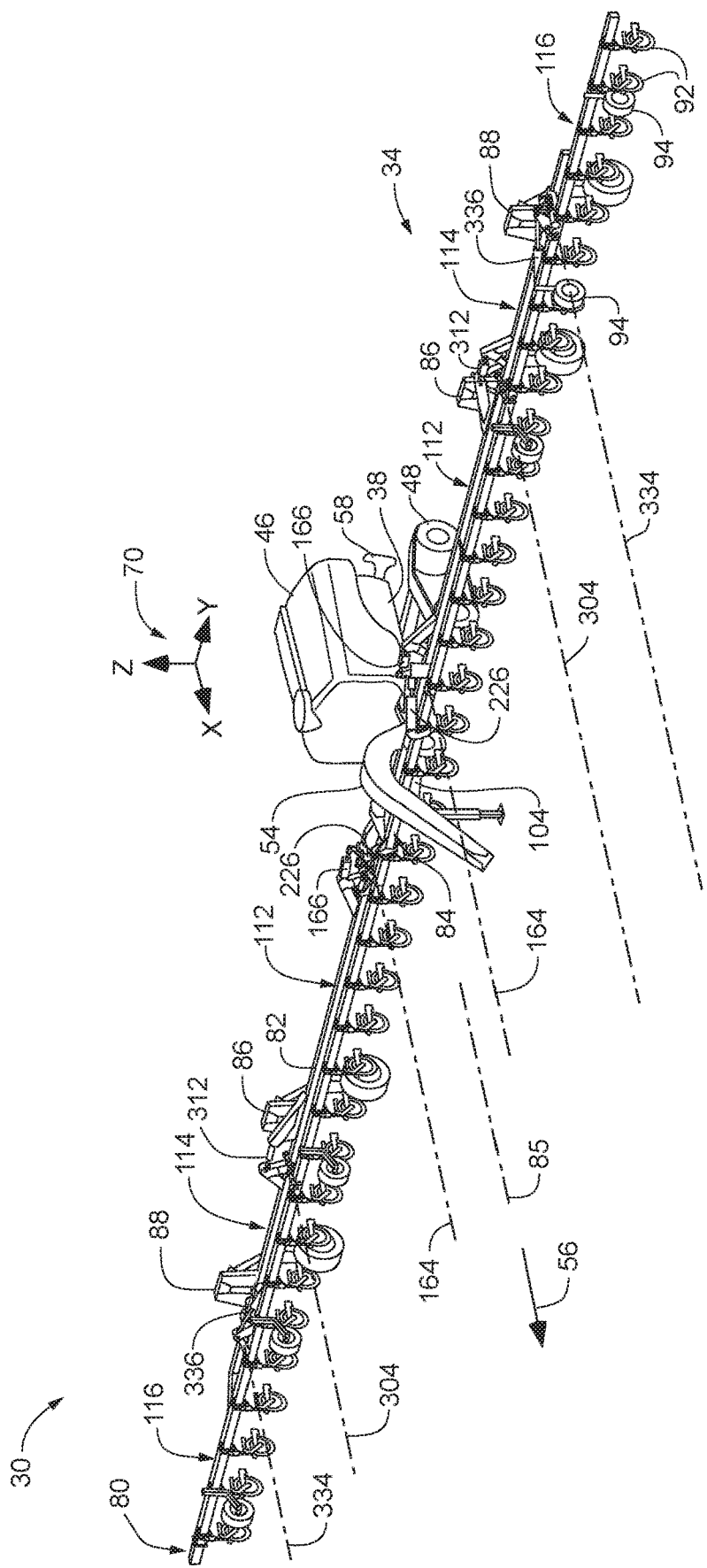
FIG. 1 is a front perspective view of an agricultural implement in an extended configuration in an embodiment of the disclosure.
Figure 2:
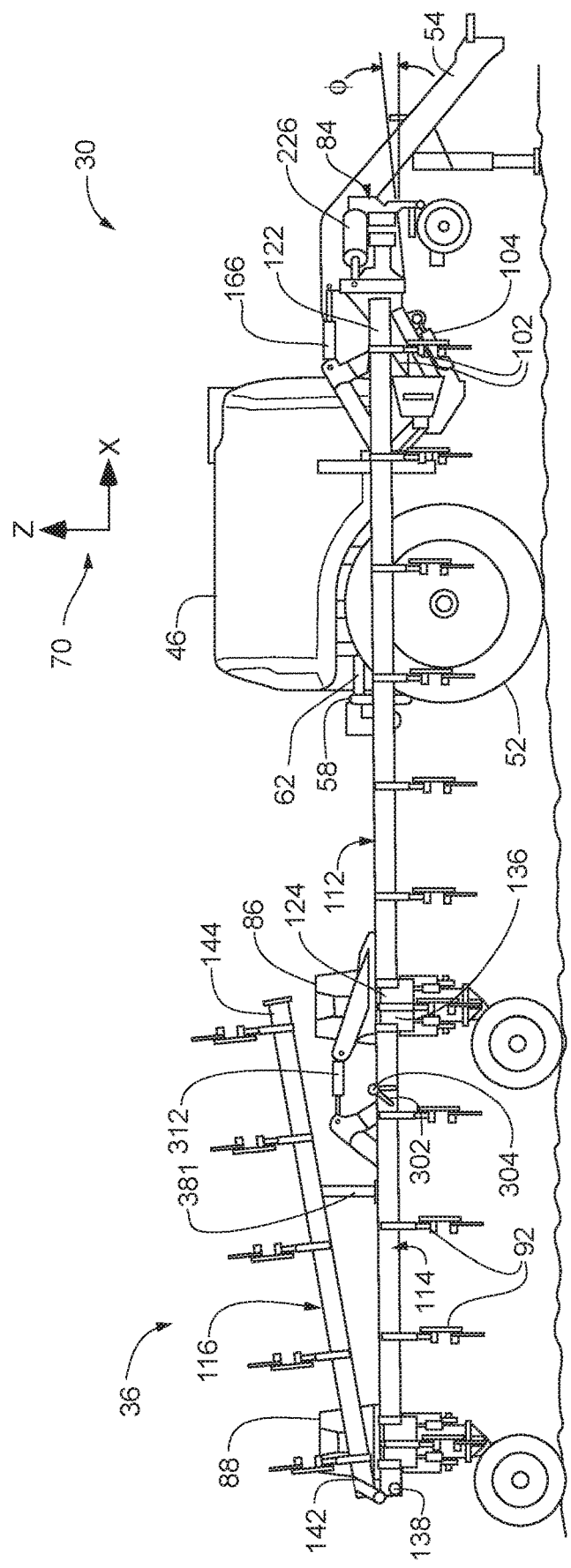
FIG. 2 is a side elevational view of an agricultural implement in a retracted configuration in an embodiment of the disclosure.
Figure 3:
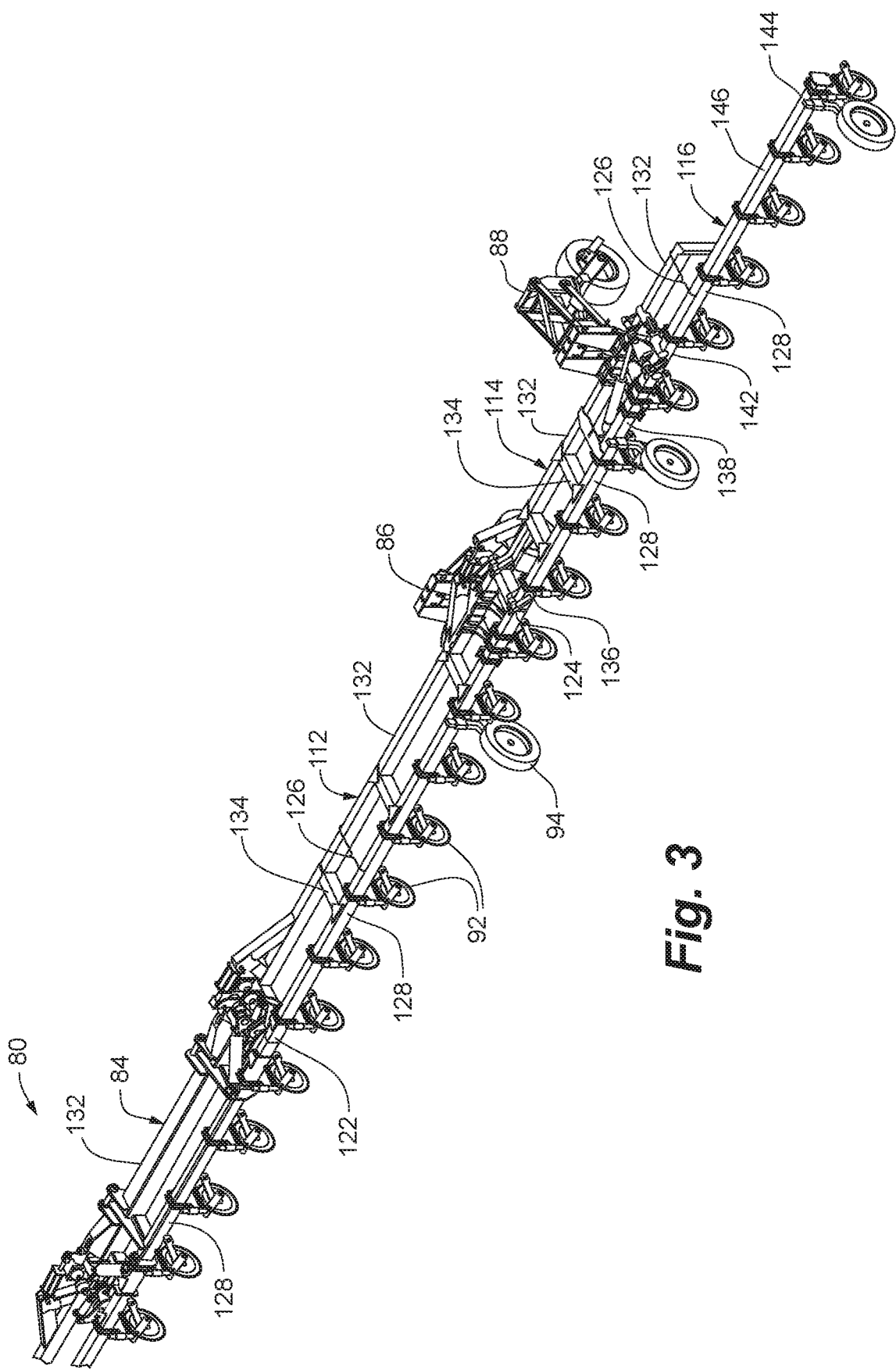
FIGS. 3 and 4 are partial perspective views of a pivotable wing of the agricultural implement of FIG. 1 in embodiments of the disclosure.
Figure 4:
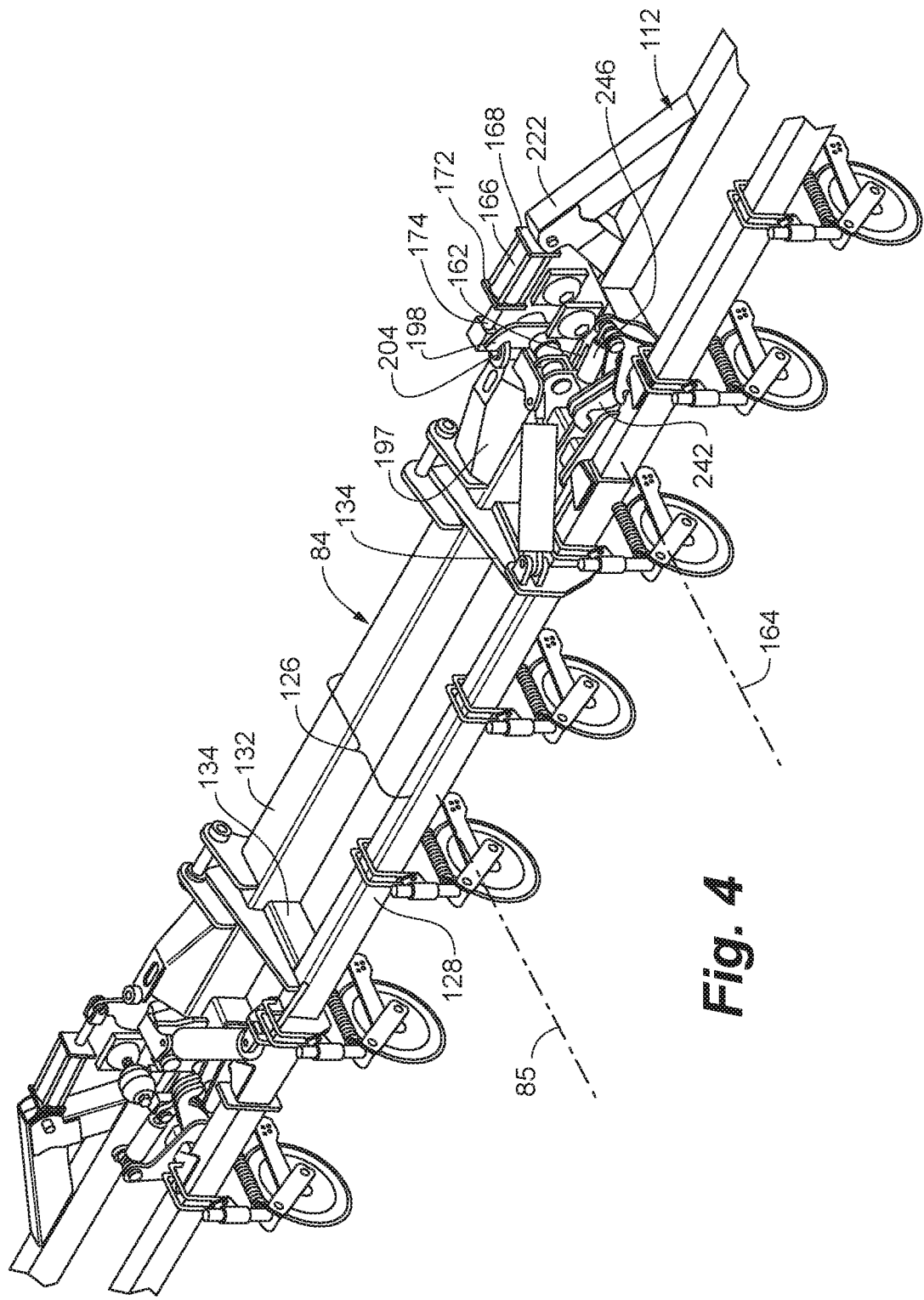

Referring to FIGS. 1 through 11, an agricultural implement 30 such as a chemical applicator is depicted in an embodiment of the disclosure. The agricultural implement 30 can be configured in a field or extended configuration 34 (FIG. 1) and in a transport or retracted configuration 36 (FIG. 2). The agricultural implement 30 includes a carriage 38 having a forward end 42 and a rearward end 44 and to which a chemical tank 46 is mounted. In one embodiment, the carriage 38 and tank 46 are suspended by a track system 48 (FIG. 1); alternatively, the carriage 38 and tank 46 may be suspended by tires 52 (FIG. 2). A tongue 54 is coupled to the carriage 38 to facilitate towing of the agricultural implement 30. The tongue 54 extends in a forward or towing direction 56 (i.e., parallel to the x-axis) of the agricultural implement 30. In some embodiments, side bumpers 58 are mounted to the carriage 38, the side bumpers 58 extending laterally beyond the carriage 38. In some embodiments, the side bumpers 58 are defined by a common structure that is mounted to a rearward face 62 of the carriage 38.

For this application, directional characteristics are described with respect to the x-y-z axes of a Cartesian coordinate system 70. "Forward" is in the positive x direction; "rearward" is in the negative x-direction; "lateral" is parallel to the y-axis; "upward" is in positive z-direction; and "downward" is in a negative z-direction. It is noted that the primary purpose of the Cartesian coordinate system 70 is to describe relative directions, and as such no point of origin is defined for the Cartesian coordinate system 70.

A tool bar assembly 80 is coupled to the carriage 38. The tool bar assembly 80 includes two opposing, pivotable wings 82 separated by a center section 84. The center section 84 is centered about a centerline 85 of the agricultural implement 30. Each pivotable wing 82 is partially supported by a main or inner lift assist assembly 86 and a mid or outer lift assist assembly 88. A plurality of ground tools 92, such as coulters, are mounted to and distributed along the tool bar assembly 80. Gauge wheels 94 may also depend from the tool bar assembly 80.

In the field or extended configuration 34 (FIG. 1), the pivotable wings 82 are oriented to extend substantially along a plane that is parallel to the y-z plane of the Cartesian coordinate system 70 (i.e., in a plane that is substantially orthogonal to the towing direction 56). In the transport or retracted configuration (FIG. 2), the pivotable wings 82 are oriented in a plane that is substantially parallel to the x-z plane of the Cartesian coordinate system 70 (i.e., in a plane that is substantially parallel to the towing direction 56).

In various embodiments, the center section 84 is coupled to the carriage 38 with linkages 102. One or more center lift actuator(s) 104 are coupled between the carriage 38 and the center section 84, for raising and lowering thereof. Functionally, the linkages 102 enable raising and lowering of the center section 84. In various embodiments, the raising and lowering of the center section 84 is achieved while substantially maintaining the rotational orientation (pitch) of the center section 84.

Each of the pivotable wings 82 includes an inner wing section 112, a mid wing section 114, and an outer wing section 116. The inner wing section 112 includes a proximal end 122 and a distal end 124. In some embodiments, the center section 84 and the inner wing section 112 are a dual beam structure 126, each including a respective forward beam 128 and a respective rearward beam 132 separated by cross members 134. Similarly, the mid wing section 114 includes a proximal end 136 and a distal end 138, and may incorporate the dual beam structure 126, including the forward beam 128 and the rearward beam 132 separated by cross members 134. The outer wing section 116 includes a proximal end 142 and a distal end 144. In the depicted embodiment, the proximal end 142 incorporates the dual beam structure 126 (a forward beam 128 and a rearward beam 132), with a transition to a single beam (e.g., the forward beam 128 as depicted) to provide a single beam construction 146 at the distal end 144.

In various embodiments, the dual beam structure 126 of the center section 84 is coupled to the linkages 102 such that the forward beam 128 is higher than the rearward beam 132, thereby defining a pitch angle $\phi$ (FIG. 2) relative to horizontal. Herein, "pitch" refers to an angular orientation in the x-z plane of the Cartesian coordinate system 70 (i.e., an angular orientation in the fore-and-aft directions of the agricultural implement 30). The center section 84 defines the pitch angle $\phi$, and the pivotable wings 82 conform to the pitch orientation of the center section 84 to also define the pitch angle $\phi$ (see, e.g., FIGS. 13 and 14). Functionally, the pitch angle $\phi$ acts to counter the draft forces on the tool bar assembly 80 when engaged with the soil. That is, the draft forces that act on the ground tools 92 when engaged with the soil impose a moment force that cause the tool bar assembly 80 to pitch downward in the forward direction 56. The pitch angle $\phi$ effectively biases the tool bar assembly 80 so that, when the tool bar assembly 80 pitches downward, the ground tools 92 more closely approximate level operation.

In some embodiments the inner and outer lift assist assemblies 86 and 88 are disposed at the distal ends of the inner wing section 112 and the mid wing section 114, respectively.

In various embodiments, the inner wing section 112 is coupled to the center section 84 by a first hinge assembly 162 (FIGS. 4, 10 and 21) that bridges the proximal end of the inner wing section 112 and the center section 84. The first hinge assembly 162 defines a first hinge axis 164 that is substantially horizontal and extends in the forward direction 56. A first lateral actuator 166 also bridges the center section 84 and the inner wing section 112. The first lateral actuator 166 includes a base end 168 and a ram end 172 that is opposite the base end 168, the ram end 172 accommodating sliding and sealed passage of a piston shaft 174. In various embodiments, the first lateral actuator 166 is a dual action actuator, such as a dual action hydraulic cylinder (depicted). Herein, a "dual action" actuator is an actuator that can be actively stroked in two directions.

In the depicted embodiment, the first hinge assembly 162 is incorporated into a reinforced pivot assembly 180 (FIGS. 5 and 6). The reinforced pivot assembly 180 includes a body portion 182 comprising a plurality of gusset plates 184 spaced along a plurality of rod members 186. A barrel portion 188 is attached to gusset plates 184, the barrel portion 188 housing a pivot dowel 192 that defines a pivot axis 194. The pivot dowel 192 may extend through both ends of the barrel portion 188. In some embodiments, the pivot dowel 192 is coupled to hinge collars 196 that extend from a hinge bracket 197. A strut 198 extends upwards from an uppermost of the plurality of rods 186, the strut 198 defining an aperture 202 for mounting of the first lateral actuator 166. Also in the depicted embodiment, a dowel cap 204 is affixed to the strut 198, for example by welding. The dowel cap 204 is aligned to capture an upper end 206 of the pivot dowel 192. A hinge dowel 208 extends through the gusset plates 184, the hinge dowel 208 defining the first hinge axis 164.

Functionally, the dowel cap 204 provides added support or reinforcement to the pivot dowel 192 to prevent deformation under heavy loads. Also in the depicted embodiment, the pivot assembly 180, which includes the hinge dowel 208, is thus configured for mounting the first hinge assembly 162 thereto, such that the pivot assembly 180 and the first hinge assembly 162 are integrated.

In the depicted embodiment, the first lateral actuator 166 is pivotally coupled the strut 198 of the pivot assembly 180 and to a strut assembly 222 on the inner wing section 112. The first lateral actuator 166 defines an actuation axis and, in some embodiments, is arranged so that the actuation axis intersects the pivot axis 194 of the pivot assembly 180.

In the depicted embodiment, the center section 84 includes the pivot assembly 180 mounted proximate the proximal end 122 of the inner wing section 112. The pivot assembly 180 is arranged so that the pivot axis 194 that extends in an upward direction 224, the "upward direction" 224 being parallel to the z-axis. (The orientation of the pivot axis 194 may be canted slightly with respect to the upward direction, as described attendant to FIGS. 20-23.) The inner wing section 112 is rotatable relative to the center section 84 about the pivot axis 194. A pivot actuator 226 is coupled between the dual beam structure 126 of the center section 84 and the pivot assembly 180.

Figure 7:
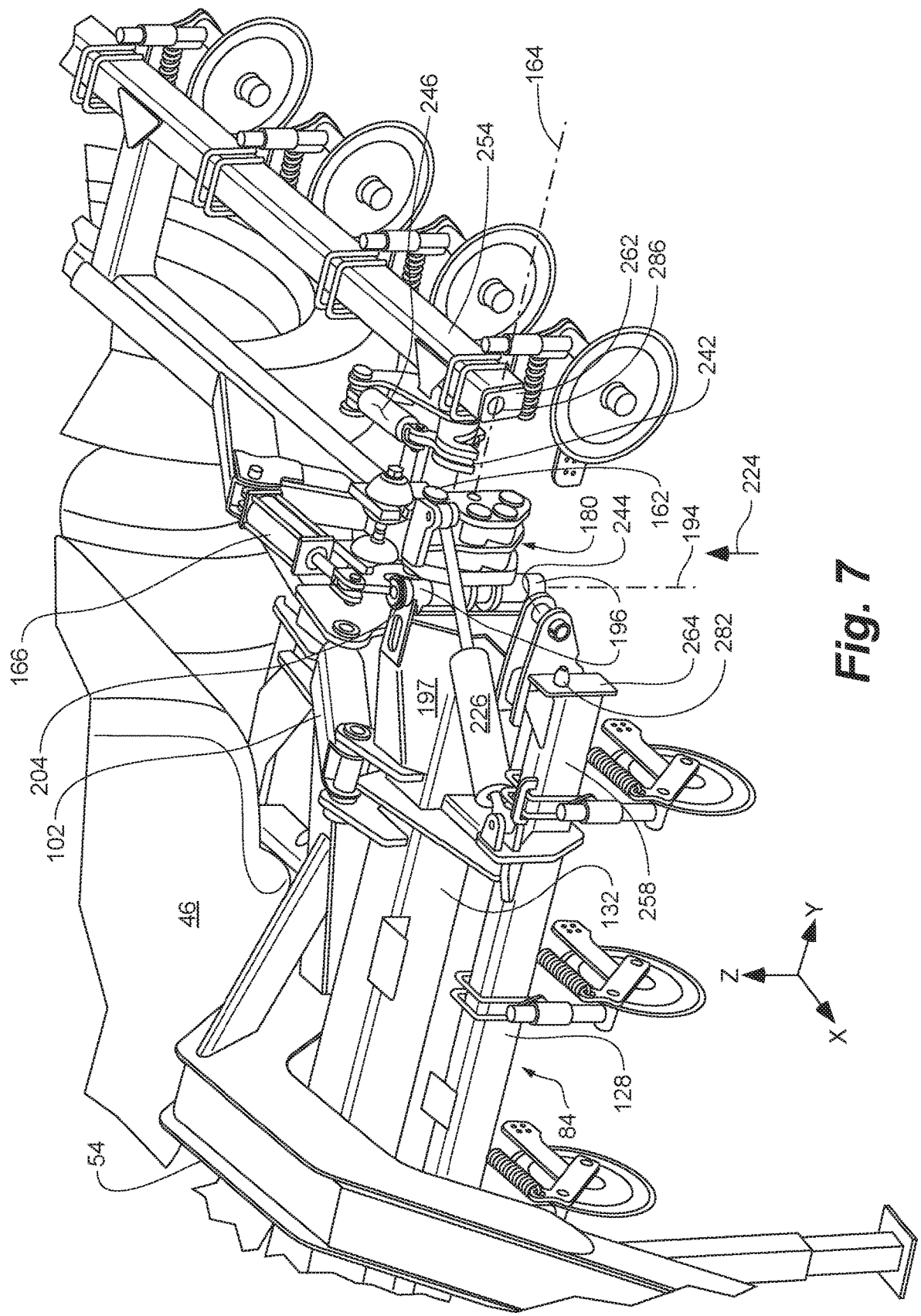
FIG. 7 is a perspective view of the pivot assembly of FIGS. 5 and 6 in assembly in a retracted configuration in an embodiment of the disclosure.
Figure 8:
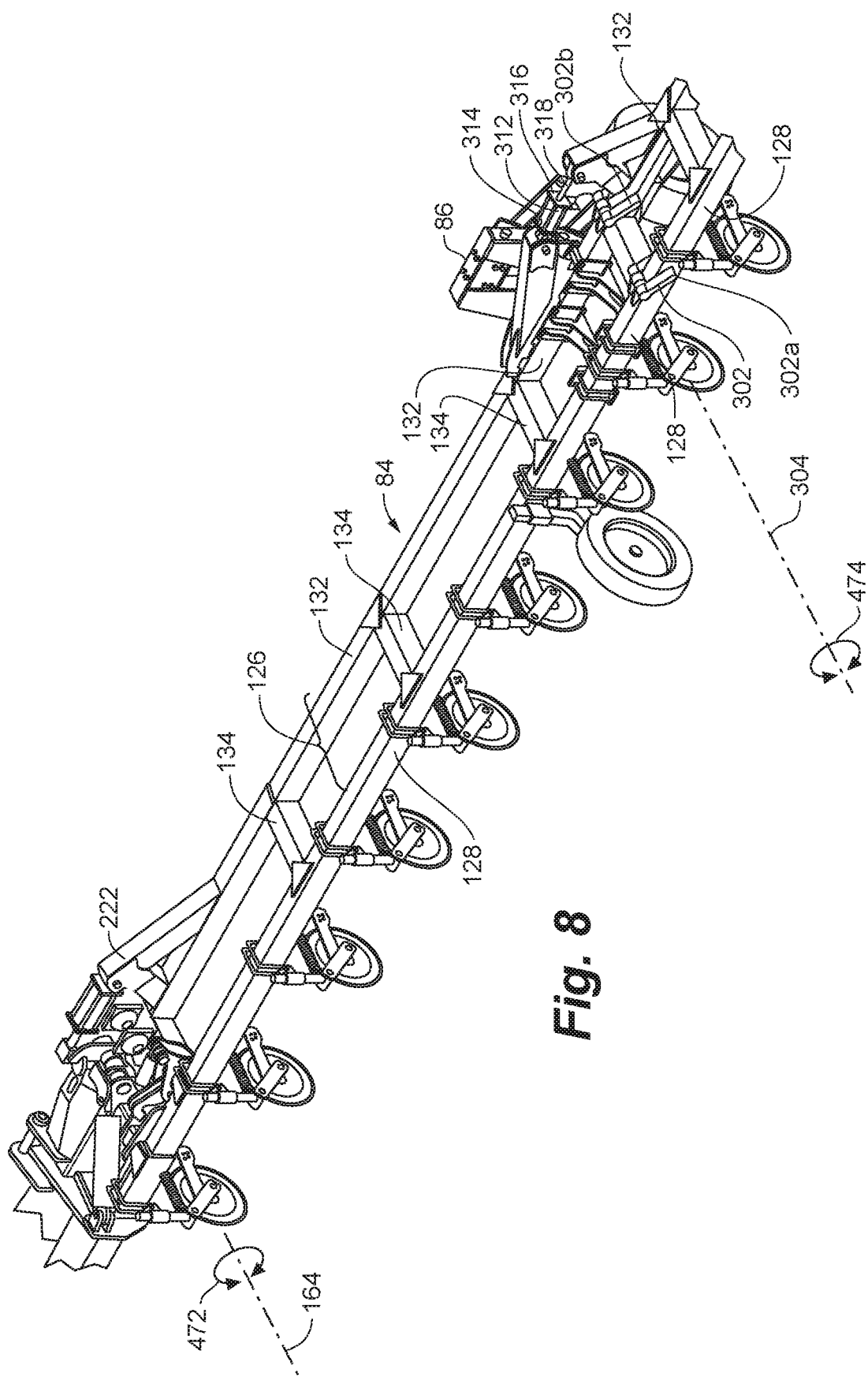
FIGS. 8 and 9 are partial perspective views of a pivotable wing of the agricultural implement of FIG. 1 in embodiments of the disclosure.

In some embodiments, the pivot assembly 180 is mounted to the center section 84 substantially in line with one of the dual beams 126 (e.g., the rearward beam 132 in the depicted embodiment). By mounting the first hinge assembly 162 to the pivot assembly 180 of the central section, the pivotable wing 82 can be rotated about the pivot axis 194 without loss of the ability of the inner wing section 112 to vertically flex relative to the carriage 38 (FIG. 7).

Figure 10:
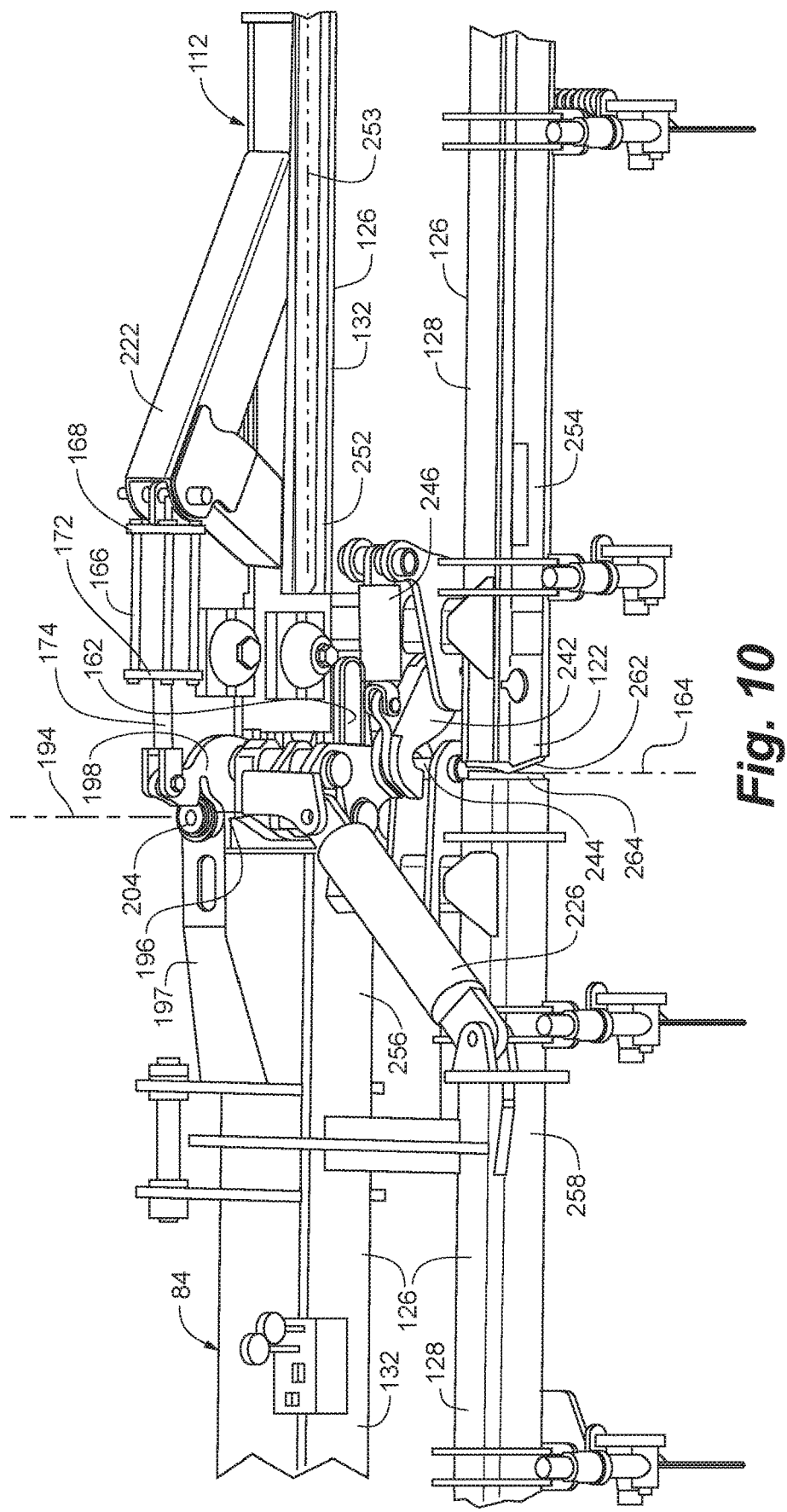
FIGS. 10 and 11 are front perspective and front elevational views, respectively, of a junction between a center section and an inner wing section of the agricultural implement in an extended configuration in an embodiment of the disclosure.

A latch hook 242 may be disposed proximate the other of the dual beams (e.g., proximate the forward beam 128) when the tool bar assembly 80 is in the extended configuration 34 (FIG. 10). In the depicted embodiment, the latch hook 242 is pivotally mounted to the proximal end 122 of the inner wing section 112, and selectively engages a latch dowel 244 disposed on the center section 84. Alternatively, the latch hook 242 may be mounted to the center section 84, with the latch dowel 244 disposed at the proximal end 122 of the inner wing section 112. The latch hook 242 may be coupled to a latch actuator 246, such as a hydraulic cylinder (depicted).

In the depicted embodiment, the rearward beam 132 of the inner wing section 112 can be pivoted about the pivot axis 194, so that the forward beam 128 is either rotated into contact with the forward beam 128 of the center section 84, or rotated away from the forward beam 128 of the center section 84. Accordingly, one of the dual beams of the inner wing section 112 (e.g., the rearward beam 132 in the depicted embodiment) can be characterized as a pivoting beam 252 that defines a longitudinal axis 253. The longitudinal axis 253 extends laterally when the pivotable wing 82 is in the extended configuration 34 and extends rearward of the center section 84 when the pivotable wing 82 is in the retracted configuration 36. The other of the dual beams of the inner wing section 112 (e.g., the forward beam 128 in the depicted embodiment) can be characterized as a detachable beam 254. The beams of the center section 84 can be characterized as a mounting beam 256 (e.g., the rearward beam 132 of the center section 84 in the depicted embodiment) and a mating beam 258 (e.g., the forward beam 128 of the center section 84 in the depicted embodiment). The mounting beam 256 can be further characterized as defining a lateral axis 257 of the center section 84 that extends perpendicular to the centerline 85.

Figure 11:
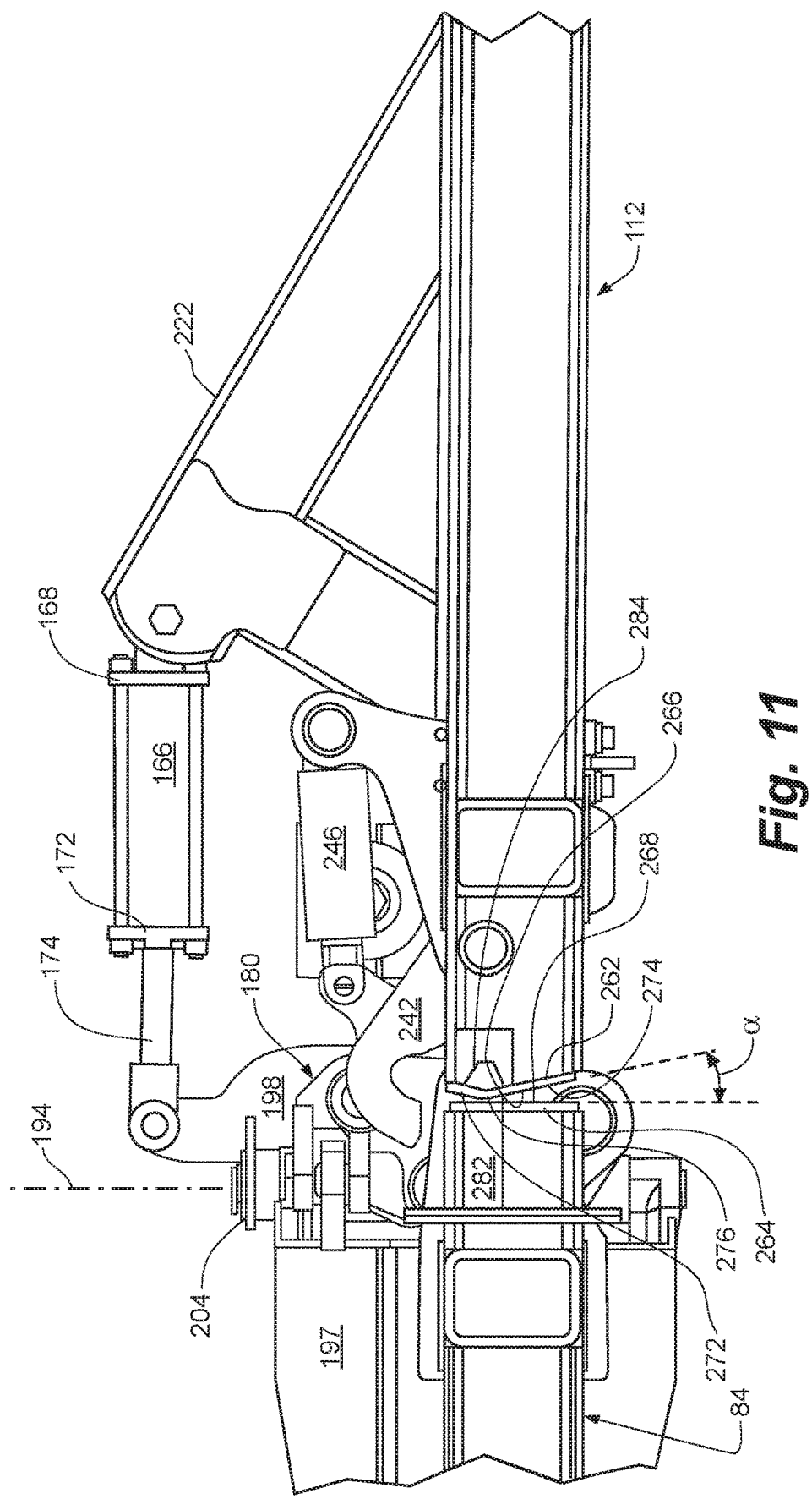

In various embodiments, the detachable beam 254 of the inner wing section 112 and the mating beam 258 of the center section 84 include contact plates 262 and 264 that define opposing contact faces 266 and 268 that bear against each other when the tool bar assembly 80 is secured in the extended configuration 34 (FIG. 11). In the depicted embodiment, a first of the contact plates 262 (e.g., the contact plate of the inner wing section 112) is contoured, configured to define two surfaces 272 and 274 that merge at a rounded apex 276. The other of the opposing contact plates 264 may be substantially planar. The contact plates 262 and 264 are positioned so that, when in contact, the line of contact between the rounded apex 276 of the contoured contact plate 262 and the planar contact plate 264 is substantially aligned with the first hinge axis 164. Also, in various embodiments, the contoured contact plate 262 cooperates with the planar contact plate 264 to define an allowance angle $\alpha$ between the contact faces 266 and 268.

In some embodiments, a support dowel 282 projects from or through the contact plate of the mating beam 258 and through an aperture 286 defined on the detachable beam 254 of the inner wing section 112, when the tool bar assembly 80 is in the extended configuration 34. A free end of the support dowel may define a conical or frusto-conical shaped end 284.

In operation, to configure the agricultural implement 30 in either the extended configuration 34 or the retracted configuration 36, the pivot actuator 226 motivates the pivot assembly 180 so that the pivotable wing 82 is rotated about the pivot axis 194, between the extended and the retracted configurations 34 and 36. To configure the agricultural implement 30 in the extended configuration 34, the pivot actuator 226 rotates the detachable beam 254 into contact with the mating beam 258. The aperture 286 of the contact plate on the detachable beam 254 is drawn over the support dowel 282. After the contact plates 262, 264 are engaged, the latch hook 242 is actuated to engage the latch dowel 244, thereby securing the inner wing section 112 in the extended configuration 34. To configure the agricultural implement 30 in the retracted configuration 36, the latch actuator 246 is activated to unlatch the latch hook 242 from the latch dowel 244, thereby enabling the inner wing section 112 to be rotated away from the center section 84. The pivot actuator 226 is activated to rotate the detachable beam 254 away from the mating beam 258, and to pivot the pivotable wing 82 into the retracted configuration 36.

Functionally, the substantial alignment of the contact line between the contact plates 262 and 264 with the pivot axis 194 in the extended configuration 34 enables the inner wing section 112 to rotate about the pivot axis 194 without binding. The allowance angle $\alpha$ defined between contoured contact plate 262 and the planar contact plate 264 is so-named because it serves to limit the angular displacement between the center section 84 and the inner wing section 112.

The conical or frusto-conical end 284 guides the detachable beam 254 of the inner wing section 112 into axial alignment with the mated beam 254 of the center section 84, and also aligns the contact line between the contoured contact plate 262 and the planar contact plate 264 with the first hinge axis 164.

In some embodiments, the mid wing section 114 is coupled to the inner wing section 112 by a second hinge assembly 302 that bridges the proximal end 136 of the mid wing section 114 and the distal end 124 of the inner wing section 112. The second hinge assembly 302 defines a second hinge axis 304 that is substantially horizontal and extends in the forward direction 56. In various embodiments, the second hinge assembly 302 includes a stop for limiting closing rotation between the inner wing section 112 and the mid wing section 114. In one embodiment, the stop limits the closing rotation of the mid wing section 114 relative to the inner wing section 112 to not exceed 20 degrees from a nominal orientation. Herein, "nominal orientation" refers to an orientation where the beam members 128, 132 of the adjacent wing sections 112, 114 are in lateral alignment ("lateral" being in a direction parallel to the y-axis). Also, "closing rotation" refers to a rotation where respective ends that are bridged by a hinge assembly rotate to reduce or "close" the allowance angle $\alpha$ defined between contoured contact plate 262 and the planar contact plate 264 (FIG. 11).

In various embodiments, there is no positive stop for an "opening rotation," i.e., a rotation where respective ends of adjacent tool bar sections that are bridged by a hinge assembly rotate to increase or "open" a gap therebetween. An example of an "opening rotation" is an upward rotation of the inner wing section 112 relative to the center section 84, which increases the allowance angle $\alpha$ defined between contoured contact plate 262 and the planar contact plate 264. Rather, the opening rotation is limited by the lift capacity of the agricultural implement 30. That is, in such embodiments, the forces generated by the lateral actuators 166, 312 are not enough to elevate the lift assist assemblies 86, 88 off the ground. Such a scenario becomes manifest for pivotable wings 82 of large reach and dimensions, such that standard lift generation (e.g., 3000 psi hydraulic sources) do not generate enough force to overcome the weights and moments of the tool bar assembly 80. Accordingly, the opening rotation is limited effectively by the upper reach of the lift assist assemblies 86 and 88, which can act to rotate the respective inner and mid wing sections 112 and 114 upwards.

The inner wing section 112 and the mid wing section 114 are also bridged by a second lateral actuator 312. The second lateral actuator 312 includes a base end 314 and a ram end 316 that is opposite the base end 314, the ram end 316 accommodating sliding and dynamically sealed passage of a piston shaft 318.

In various embodiments, the second lateral actuator 312 is a dual action actuator, such as a dual action hydraulic cylinder (depicted). The second lateral actuator 312 is pivotally coupled on one end to a strut assembly on the inner wing section 112 and on the other end to a strut assembly on the mid wing section 114.

The outer wing section 116 may be coupled to the mid wing section 114 by a third hinge assembly 332 that bridges the proximal end 142 of the outer wing section 116 and the distal end 138 of the mid wing section 114. The third hinge assembly 332 defines a third hinge axis 334 that is substantially horizontal and extends in the forward direction 56. In various embodiments, the third hinge assembly 332 includes a stop that limits closing rotation between the mid wing section 114 and the outer wing section 116, and within the same ranges described above for the second hinge assembly 302.

Because of the dual beam construction 126, both of the second and third hinge assemblies 302 and 332 of the depicted embodiment include two hinge members—one bridging the forward beams 128 (i.e., hinge members 302a and 332a), the other bridging the rearward beams 132 (i.e., hinge members 302b and 332b). Both of the hinge members of a given hinge assembly 302, 332 are arranged to rotate about the hinge axis 304, 334 of the respective hinge assembly 302, 332. It is noted that not all embodiments require multiple hinges for the hinge assembly. For example, embodiments implementing a single beam tool bar (not depicted) could conceivably implement a single hinge for the hinge assembly.

Figure 9:
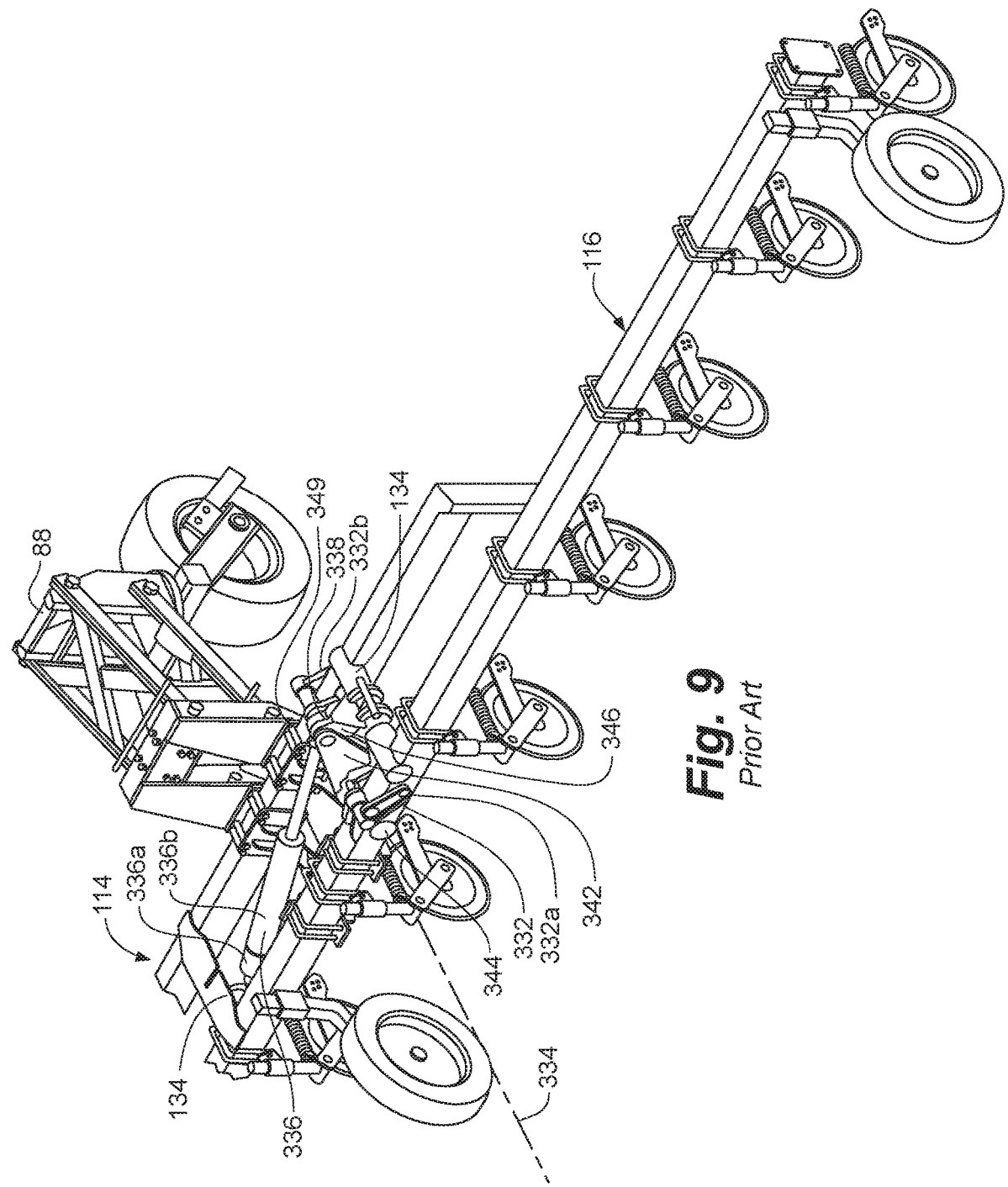
Figure 15:
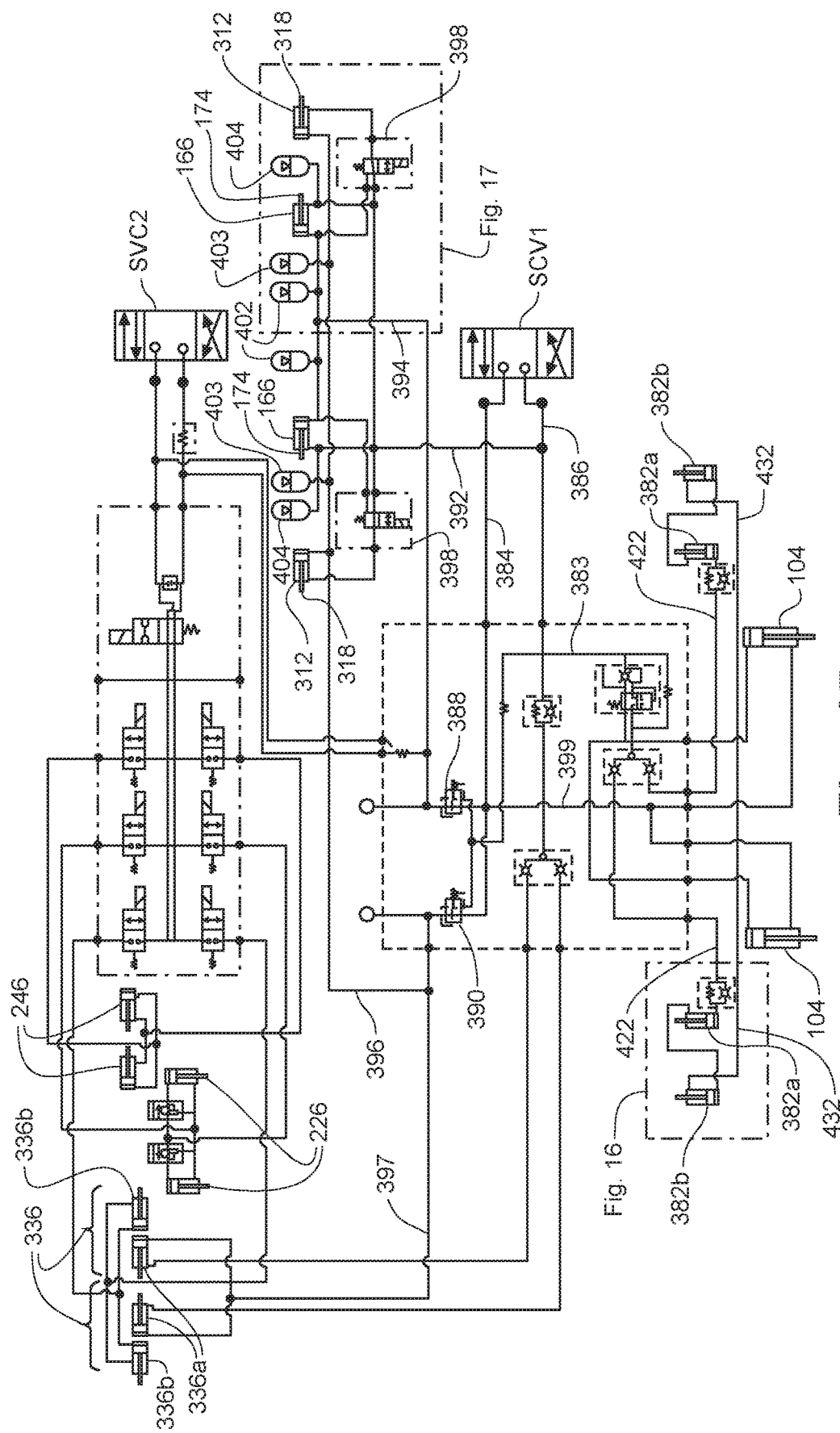
FIG. 15 is a schematic of a hydraulic system for the agricultural implement in an embodiment of the disclosure.

The mid wing section 114 and the outer wing section 116 are also bridged by a third lateral actuator 336. In various embodiments, the third lateral actuator 336 is a double acting actuator, such as a double acting hydraulic cylinder (depicted). Herein, a "double acting" actuator can act in two different directions independently. In the depicted embodiment the third lateral actuator 336 is effectively an inner actuator 336a and an outer actuator 336b that are coupled together to act in opposing directions (FIGS. 9 and 15). In the depicted embodiment, the third lateral actuator 336 is pivotally mounted on one end to a cross member 134 of the mid wing section 114, and the other end to a yoke assembly 338. In various embodiments, the yoke assembly 338 bridges the mid wing section 114 and the outer wing section 116. A first arm 342 of the yoke assembly 338 is pivotally mounted to an axle 344 that spans the forward and rearward beams 128 and 132 of the mid wing section 114. A second arm 346 of the yoke assembly 338 is affixed to a cross member 134 of the outer wing section 116. The first and second yoke arms 342 and 346, as well as the third lateral actuator 336, are pivotally coupled to a pin 349.

Referring to FIGS. 12 through 14, a lift assist assembly 370 that may be used for the inner and outer lift assist assemblies 86 and 88 is depicted for use in embodiments of the disclosure. The lift assist assembly 370 includes a swivel assembly 372 supported by a base wheel assembly 374, the swivel assembly 372 being coupled to a mounting rack 376 via linkages 378. A lift assist actuator 382 is coupled on one end to the swivel assembly 372 and on the other to the mounting rack 376. In the depicted embodiment, the mounting rack 376 is configured for coupling with the dual beam structure 126 of the pivotable wing 82. The lift assist assembly 370 can be configured in a raised configuration (FIG. 13) with the lift assist actuator 382 extended for disengaging the tool bar assembly 80 from the ground, and in a lowered configuration (FIG. 14) with the lift assist actuator 382 retracted for engaging the tool bar assembly 80 with the ground. In various embodiments, the lift assist actuator 382 is a dual action actuator, such as a dual action hydraulic cylinder (depicted). The lift assist actuator 382 of the inner lift assist assembly 86 is referred to herein as the inner lift assist actuator 382a, and the lift assist actuator 382 of the outer lift assist assembly 88 is referred to herein as the outer lift assist actuator 382b.

Functionally, the swivel assembly 372 enables the base wheel assembly 374 of the lift assist assembly 370 to passively rotate, for example, as the pivotable wing 82 is maneuvered between the extended and the retracted positions, the agricultural implement 30 executes a turn in the field configuration 34 or the transport configuration 36, or while backing up the agricultural implement 30. In the depicted embodiment, the inner and outer lift assist assemblies 86 and 88 remain in contact with the ground at all times to support the pivotable wing 82. Thus, the inner and outer lift assist assemblies 86 and 88 are able to assume whatever orientation is necessary in the extended and retracted positions, including executing turns in the field or when backing up, as well as points between the extended and retracted positions during actuation of the pivotable wing 82.

Referring to FIG. 13A, a schematic 380 of the lift assist assemblies 371 and 371' are depicted in an embodiment of the disclosure. The components of the lift assist assembly 371 are represented by solid lines, and the components of the lift assist assembly 371' are represented by phantom lines. The individual schematic elements of the lift assist assembly 371 are identified by the same numbered components corresponding to the lift assist assembly 370 of FIGS. 12-14. The corresponding counterparts and characteristics of the lift assist assembly 371' are identified by the same numbered components followed by a an apostrophe (') suffix. The schematic 380 identifies the linkages 378 individually as an upper linkage 378a (and 378a') and a lower linkage 378b (and 378b').

In some embodiments, linkages 378a and 378b are of different length. In the depicted embodiment, the upper linkage 378a is longer than the lower linkage 378b. For purposes of comparison, the schematic 380 presents linkages 378a' and 378b' of equal length. The schematic 380 also includes a center of gravity CG and weight W representing, respectively, the location of the tool bar assembly 80 and the portion of the weight of the tool bar assembly 80 that is supported by the lift assist assembly 371, 371'. The weight W, causes a reactive force R that acts on the wheel assemblies 374, 374'. Also depicted is a moment M, M' about the center of gravity CG generated by a horizontal offset H, H' between the weight W and reaction force R.

The effect of the upper linkage 378a being longer than the lower linkage 378b is illustrated by the schematic 380. Both lift assist assemblies 371 and 371' of the schematic 380 conform to the orientation of the mounting rack 376, the orientation of the mounting rack 376 being influenced primarily by the orientation of the center section 84. Accordingly, the lift assist assemblies 371 and 371' of the schematic 380 will "follow" the mounting rack 376, such that the wheel base 374, 374' adapt to an equilibrium position driven in part by the orientation of the mounting rack 376.

The lift assist assemblies 371 and 371' are disposed in a rotational orientations that positions the wheel base 374 at the horizontal offsets H and H', respectively, relative to the center of gravity CG. The longer upper linkage 378a of lift assist assembly 371 causes the wheel base 374 to rotate towards the mounting rack 376, such that the horizontal distance H for the wheel base 374 of lift assist assembly 371 is shorter than the horizontal distance H' for the wheel base 374' of lift assist assembly 371'. Functionally, the shorter horizontal offset H provided by the longer upper linkage 378 results in the moment M being of less magnitude that the moment M'.

Referring to FIGS. 15 through 19, schematic representations of a hydraulic system 400 for operating hydraulic actuators of the tool bar assembly 80 are depicted in an embodiment of the disclosure. Of course, in this embodiment, the various actuators of the agricultural implement 30 are hydraulic cylinders 410. Also, in the depicted embodiment, the hydraulic cylinders 410 are dual action, each defining a base end chamber 406 and a ram end chamber 408 that are ported for application of pressure and flow of hydraulic fluid. The various actuators represented in the schematics are identified by the same numerical references discussed in relation to the tool bar assembly 80.

The lateral actuators 166 and 312 are powered by hydraulic source/return lines 384, 386 which are connected, for example, to a first selective control valve (SCV1) of a tractor. In the depicted embodiment, a first branch line 392 is routed directly from the hydraulic source/return line 386 and is distributed to the ram end chambers 408 of the lateral actuators 166 and 312. A second branch line 383 may also be routed from the hydraulic source/return line 386 for sourcing of the lift assist actuators 382a and 382b. In some embodiments, the hydraulic source/return line 386 are plumbed to the ram end chambers of the inner actuators 336a of the third lateral actuators 336. Also in the depicted embodiment, the hydraulic source/return line 384 is in fluid communication with the lateral actuators 166 and 312 via pressure regulation/relief cartridges 388 and 390, respectively. Hydraulic fluid is routed from the pressure regulation/relief cartridge 388 to the lateral actuators 166 and 312 via regulated pressure lines 394 and 396, respectively. Also in the depicted embodiment, a rerouting valve 398, such as a solenoid valve (depicted) is disposed between each of the lateral actuators 166 and 312, with the hydraulic fluid from the hydraulic source/return line 386 being routed through the rerouting valve 398 to the ram end chambers 408 of the second lateral actuator 312.

A regulated pressure line 397 may also be routed from the pressure regulation/relief cartridge 390 to the base end chambers of the inner actuators 336a of the third lateral actuators 336, for down force pressurization and return of hydraulic fluid during operation of the outer wing sections 116. Also, a third branch line 399 may be routed from the hydraulic source/return line 384 to the ram end chambers of the center lift actuator(s) 104 for lowering of the tool bar assembly 80.

The hydraulic source/return lines 384 and 386 are selectively switchable by SCV1. That is, in a first configuration of SCV1, hydraulic source/return line 384 serves as the source line and hydraulic source/return line 386 serves as the return line, returning displaced hydraulic fluid to a hydraulic tank (not depicted). In a second configuration of SCV1, hydraulic source/return line 386 serves as the source line and hydraulic source/return line 384 serves as the return line. In a third configuration, SCV1 closes both hydraulic source/return lines 384 and 386.

Functionally, the pressure regulation/relief cartridges 388 and 390 operate to regulate the pressure of the fluid entering the regulated pressure lines 394 and 396, respectively, when the hydraulic source/return line 384 serves as a source line. The pressure regulation/relief cartridges 388 and 390 may be set to provide different regulated pressures. By way of non-limiting example, the pressure exiting pressure regulation/relief cartridge 388 and routed to the first lateral actuator 166 via regulated pressure line 394 may be set at 500 psi, while the pressure exiting pressure regulation/relief cartridge 390 and routed to the second lateral actuator 312 via regulated pressure line 396 may be set at 1500 psi.

The pressure regulation/relief cartridges 388 and 390 may also operate to enable return flow therethrough when the hydraulic source/return line 384 serves as a return line. The pressure regulation/relief cartridges 388 and 390 may require that a threshold pressure be reached before return flow to hydraulic source/return line 384 is enabled. In one non-limiting example, the threshold pressure may be a predetermined or set "delta" value over the regulated pressure, such as 50 psi. In such a configuration, if the regulated pressure is set, for example, at 500 psi, pressure relief will occur at 500 psi plus the delta value (i.e., at 550 psi for the example above).

While the depicted embodiment presents pressure regulation/relief cartridges 388 and 390, it is recognized that an assembly of hydraulic regulation and relief components may be assembled for equivalent function.

The hydraulic system 400 may also include a second selective control valve (SCV2) for control of folding and pivot operations. The SCV2 may be coupled to the latch actuators 246, the pivot actuators 226, and the outer actuators 336b of the third lateral actuators 336 as depicted in FIG. 15.

In operation, the hydraulic system 400 can be configured for three operating modes: (1) down force, (2) field lift assist, and (3) transport. In the down force mode, SCV1 is configured to source (pressurize) hydraulic source/return line 384, with hydraulic source/return line 386 and, therefore, first branch line 392 serving as return lines. The rerouting valve 398 is configured to manifold the ram end chambers 408 of the lateral actuators 166 and 312 to the first branch line 392. Sourcing of the hydraulic source/return line 384 pressurizes the ram end chambers of the center lift actuator(s) 104, causing them to retract, thereby lowering the center section 84 of the tool bar 80. In the depicted embodiment, the sourcing of the hydraulic source/return line 384 also delivers pressure to the lift assist actuators 382a and 382b for concurrent lowering the pivotable wings 82, explained in more detail below.

The pressure regulation/relief cartridges 388 and 390, being pressurized by the hydraulic source/return line 384 in the down force mode, operate as regulators, delivering hydraulic fluid to the regulated pressure lines 394 and 396, respectively, at the respective preset pressures. The regulated pressure lines 394 and 396 deliver pressurized hydraulic fluid to the base end chambers 406 of the lateral actuators 166 and 312, which exerts a laterally outward force on the piston shafts 174, 318. The outward lateral forces generate downward moments about the first and second hinge axes 164 and 304 of each of the pivotable wings 82, causing the inner and mid-wing sections 112 and 114 to exert a downward force onto the terrain. For configurations utilizing regulated pressure line 397, sourcing of the hydraulic source/return line 384 also causes the inner actuator 336a of the third lateral actuator 336 to extend laterally outward and the outer wing section 116 to exert a downward force onto the terrain.

In the field lift assist mode, the hydraulic source/return line 386 is sourced (pressurized) and the hydraulic source/return line 384 serves as a return line. The rerouting valves 398 are configured to route the ram end chambers 408 of the second lateral actuators 312 to the base end chambers 406 of the first lateral actuators 166. The first branch line 392 delivers hydraulic fluid at an unregulated pressure to the ram end chambers 408 of the first lateral actuators 166, exerting a laterally inward force on the piston shafts 174. Movement of the piston shafts 174 causes displacement of hydraulic fluid within the base end chambers 406 of the first lateral actuators 166, which is routed to the ram end chambers 408 of the second lateral actuators 312 via rerouting valves 398 to exert a laterally inward force on the piston shafts 318. Movement of the piston shafts 318 causes displacement of hydraulic fluid within the base end chambers 406 of the second lateral actuators 312, which is routed into regulated pressure lines 394 and 396. Because the pressurization of the ram end chambers 408 is unregulated, the pressure generated in the base end chambers 406 and applied to the regulation/relief cartridges 388 and 390 via the regulated pressure lines 394 and 396 exceed the threshold pressures of the regulation/relief cartridges 388 and 390. Accordingly, the regulation/relief cartridges 388 and 390 serve as pressure relief valves that enable displaced hydraulic fluid from the regulated pressure lines 394 and 396 to be returned to the hydraulic source/return line 384 to SCV1.

The inward lateral forces exerted on the piston shafts 174, 318 generate upward moments about the first and second hinge axes 164 and 304 of each of the pivotable wings 82, causing the inner and mid-wing sections 112 and 114 to exert a lifting force away from the terrain. For configurations where the hydraulic source/return line 386 also sources the ram end chambers of the inner actuator 336a of the third lateral actuators 336, the sourcing of the hydraulic source/return line 384 also causes the third lateral actuator 336 to extend laterally inward and the outer wing section 116 to exert a lifting force away from the terrain.

With respect the transport mode, the hydraulic system 400 is first configured in the field lift assist mode in order to lift the ground tools 92 off the ground and ready the agricultural implement 30 for transport. After elevated the tool bar assembly 80 in the field lift assist mode, SCV1 is configured to close both hydraulic source/return lines 384 and 386 for the transport mode. Closure of the hydraulic source/return lines 384 and 386 maintains the center lift actuator(s) 104, the lift assist actuators 382a and 382b, and the inner actuator 336a of the third lateral actuator 336. Closure of the hydraulic source/return lines 384 and 386 also seals off lines 392, 394, and 396 leading to the lateral actuators 166 and 312. Hydraulic fluid being incompressible, the hydraulic lines and components in fluid communication with the hydraulic source/return lines 384 and 386 readily settle at some equilibrium pressure. SCV2 may then be selectively configured to actuate the outer actuators 336b for folding the outer wing section 116 onto the mid wing section 114, to actuate the latch actuators 246 for unlatching the pivotable wings 82 from the center section 84, and to actuate the pivot actuators 226 for drawing the pivotable wings 82 into the transport configuration 36.

For various embodiments, a greater downward moment about the second hinge axes 304 when in the field configuration 34 than when in the transport configuration 36. This is because the effective moment arm of the mid- and outer wing sections 114 and 116 is greater in the field configuration 34 than in the transport configuration 36. That is, when the outer wing section 116 is folded in the transport configuration 36, the torque or moment about the second hinge axis 304 that is required of the second lateral actuator 312 is reduced relative to the extended configuration 34 because the combined center of mass of the mid wing section 114 and outer wing section 116 is closer to the hinge axis 304 about which the mid wing section 114 pivots (compare FIGS. 1 and 2). If the downward moment about the pivot axes 304 were the same in the transport configuration 36 as in the field configuration 34, the pivotable wings 82 of the tool bar assembly 80 would undergo distortions and undue stresses in the transport configuration 36.

Functionally, the configuration of the hydraulic system 400 remedies this situation, without need for componentry that dynamically adjusting the regulated pressures of the pressure regulation/relief cartridges 388 or 390. When in the transport mode, as in the field lift assist mode, the hydraulic system 400 is configured so that the rerouting valve 398 releases the hydraulic pressure of the ram end chamber 408 of the second lateral actuator 312 when the pivotable wings 82 are folded into the transport configuration 36. The hydraulic fluid can flow out of the ram end chamber 408 of the second lateral actuator 312, thereby reducing the uplift force exerted on the mid wing section 114. In the depicted embodiment, the hydraulic fluid exiting the ram end chamber 408 of the second lateral actuator 312 is routed to the base end chamber 406 of actuator 166 during this pressure relief (i.e., upon actuation of the rerouting valve 398), thereby placing the base end chambers 406 and the ram end chambers 408 of the lateral actuators 166 and 312 in approximately equal pressures. In this way, no appreciable net force is exerted in either direction by the lateral actuators 166 and 312, and no attendant distortions or stresses result. Also, by relieving the hydraulic pressure in the ram end chamber 408 of the second lateral actuator 312 and substantially equalizing the pressure between the base end chambers 406 and the ram end chambers 408 of the lateral actuators 166 and 312, the weight carried by lift assist assemblies 86 and 88 is more evenly distributed between lift assist assemblies 86 and 88 when the outer wing section 116 is folded over the mid wing section 114 for the transport configuration 36.

In some embodiments, the hydraulic system includes a plurality of accumulators 402 and 404 associated with the first lateral actuator 166, accumulator 402 for the base end chamber 406 of the first lateral actuator 166, accumulator 403 for the base end chamber 406 of the second lateral actuator 312, and accumulator 404 for the ram end chamber 408 of the first lateral actuator 166. In the depicted embodiment, the accumulators 402 and 404 are selectively coupled to the second lateral actuators 312 through the rerouting valves 398, so that when the base end chamber 406 of one of the lateral actuators 166 or 312 is coupled to accumulator 402, so is the base end chamber 406 of the other of the lateral actuators 312 or 166. Likewise, in this embodiment, when the ram end chamber 408 of one of the lateral actuators 166 or 312 is coupled to accumulator 404, so is the ram end chamber 408 of the other of the lateral actuators 312 or 166. Also in the depicted embodiment, the accumulator 403 may be devoted to the base end of the second lateral actuator 312. In alternative embodiments (not depicted), the accumulators 402 and 404, or separate accumulators, may be directly coupled with the ram end chambers 408 of the second lateral actuator 312 as well (not depicted).

In the depicted embodiment, where the hydraulic cylinders 410 are dual action cylinders in combination with accumulators 402 and 404, the rerouting valve 398 can be configured so that the ram end chambers 408 of the lateral actuators 166 and 312 of both of the two opposing, pivotable wings 82 of the tool bar assembly 80 are ganged together in a closed hydraulic circuit (FIG. 15). Also, in some embodiments, accumulators 402 and 404 remain operatively coupled to actuators 166 and 312 via the rerouting valve 398 when in the transport configuration 36.

Functionally, the accumulators 402, 403, and 404 enable flow of hydraulic fluid into and out of the lateral actuators 166 and 312, even though SCV2 is closed and flow cannot return to the tank. Hydraulic fluid can flow between the base end chambers 406, the ram end chambers 408 of the lateral actuators 166 and 312, and the various accumulators 402, 403, and 404 during transport of the agricultural implement, for example, when undulations of terrain cause flexing about the axes 164 and 304 when in the transport configuration 36 (FIG. 2). In this way, the lateral actuators 166 and 312 can follow the flexing about axes 164 and 304 due to terrain changes. That is, the hydraulic system 200 does not impose a stiffness on the tool bar assembly 80 when in the transport configuration 36.

Functionally, the accumulators 402 and 404 provide cushion to the first lateral actuator 166, so that the first lateral actuator 166 enables flexing between the center section 84 and the inner wing section 112. More specifically, the accumulators 402 and 404 enable the lateral actuator 166 to absorb impulse forces in response to sudden impacts or changes in the angular orientation of the various wing sections about the various hinge axes in response to changing terrain. In embodiments implementing the accumulators 402 and 404 or separate accumulators with the base and ram end chambers 406, 408 of the second lateral actuator 312 provide the same effect to the second lateral actuator 312.

Figure 16:
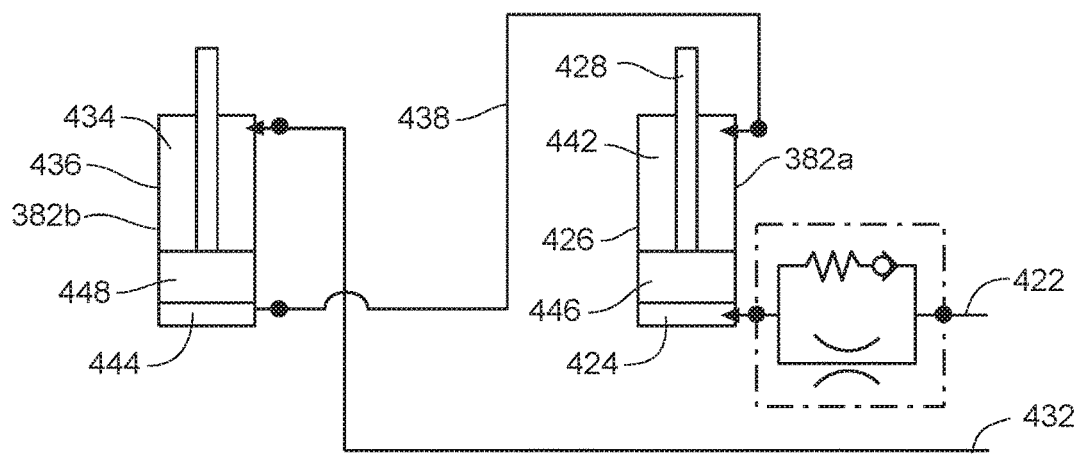
FIG. 16 is an enlarged portion of the schematic of FIG. 15 schematically representing first and second lift assist actuators in an embodiment of the disclosure.
Figure 17:
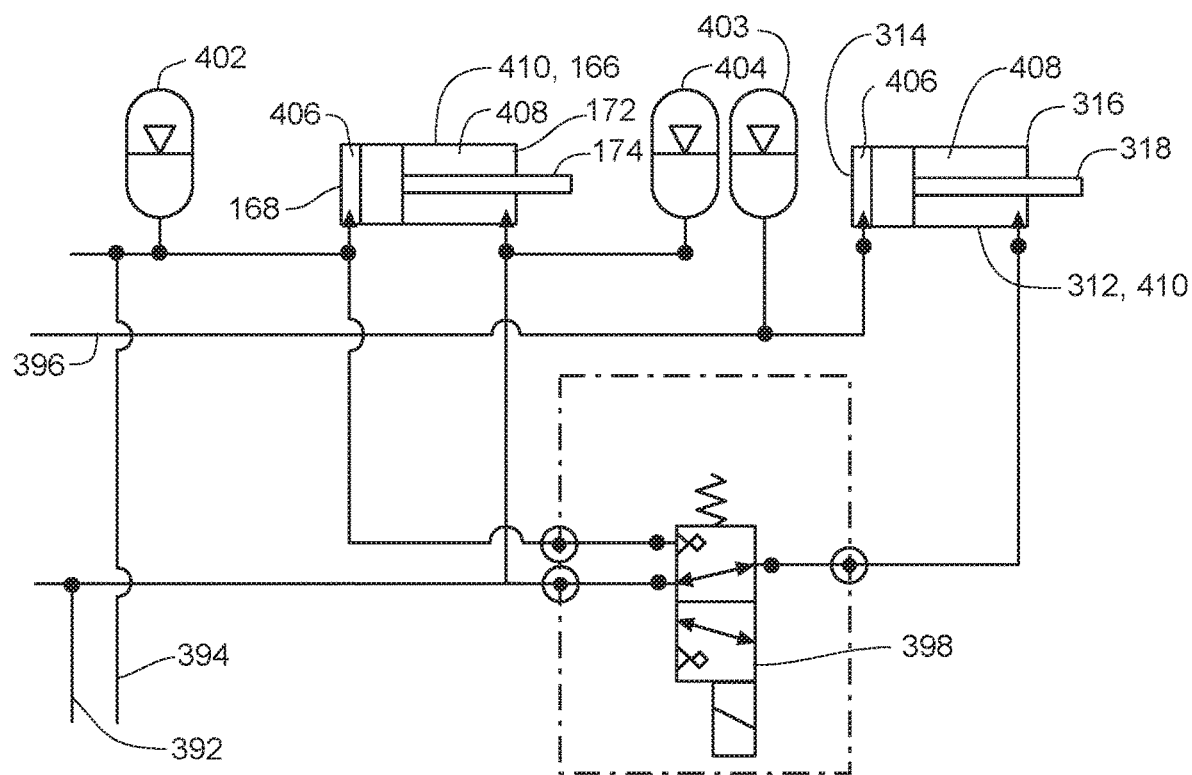
FIG. 17 is an enlarged portion of the schematic of FIG. 15 schematically representing a first lateral actuator and a second lateral actuator in an embodiment of the disclosure.

In various embodiments, the lift assist actuators 382*a* and 382*b* of the lift assist assemblies 86 and 88 are arranged to synchronously raise and lower the tool bar assembly 80. In the depicted embodiment, a first pressurization line 422 is coupled to a base end chamber 424 of a hydraulic cylinder 426 of the inner lift assist actuator 382*a*, and a second pressurization line 432 is coupled to a ram end chamber 434 of a hydraulic cylinder 436 of the outer lift assist actuator 382*b* (FIG. 16). A transfer line 438 is plumbed between a ram end chamber 442 of the hydraulic cylinder 426 of the inner lift assist actuator 382*a* and a base end chamber 444 of the hydraulic cylinder 436 of the outer lift assist actuator 382*b*.

The hydraulic cylinders 426 and 436 of the inner and outer lift assist actuators 382*a* and 382*b* are sized so that an effective area of a piston 446 facing the ram end chamber 442 of the inner lift assist actuator 382*a* is equal to the effective area of the base end chamber 444 of the outer lift assist actuator 382*b*. Herein, the "effective area" is a cross-sectional area normal to the actuation axis that defines the volume of liquid occupying the hydraulic cylinder. For the base end chamber 444, the effective area is the area defined by an inner diameter 445 of the hydraulic cylinder 436; for the ram end chamber 442, the effective area is the area defined by an inner diameter 447 of the hydraulic cylinder 426 minus a cross-sectional area of the ram shaft 428.

In operation, because the effective areas of the hydraulic chambers 442 and 444 joined by the transfer line 438 are substantially matched, the displacement of the respective pistons 446 and 448 per unit volume of hydraulic fluid are equal. Accordingly, the rate of stroke of both the inner lift assist actuator 328*a* and the outer lift assist actuator 328*b* are equal, thus preventing undue flexing or stresses to the tool bar assembly 80 when adjusting the height of the inner and outer lift assist actuators 328*a* and 328*b*.

Figure 18:
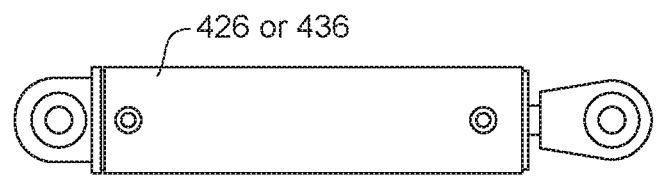
FIG. 18 is a plan view of a hydraulic actuator utilized in the lateral actuators of the inner and outer lift assist actuators according to embodiments of the disclosure.
Figure 18A:
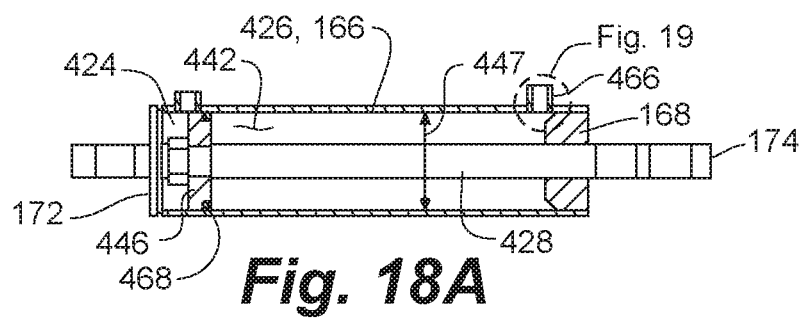
FIGS. 18A and 18B are sectional views the hydraulic actuator of FIG. 18 for the inner and outer lift assist actuators lateral actuators, respectively, according to embodiments of the disclosure.
Figure 18B:
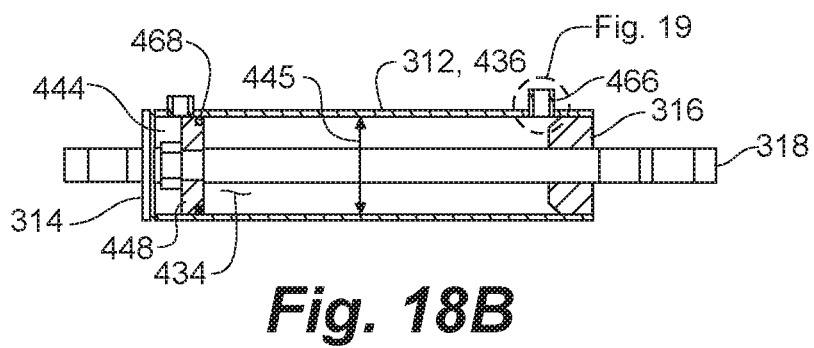
Figure 19:
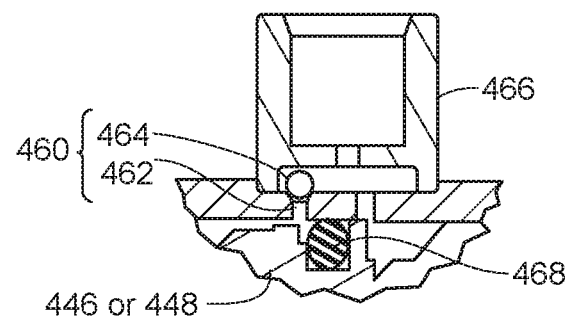
FIG. 19 is an enlarged partial view of a hydraulic port of the hydraulic actuators of FIGS. 18A and 18B according to an embodiment of the disclosure.

In some embodiments, the inner and outer lift assist actuators 328*a* and 3286 both include a "rephasing circuit" 460 (FIG. 19). The rephasing circuit 460 includes a bypass circuit 462 such as a small diameter (e.g., 0.063 inch) bypass orifice (depicted) in communication with a hydraulic port 466 at the ram end chamber of a given hydraulic cylinder, the hydraulic port 466 being coupled to the pressurization line 422 or 438 of the respective hydraulic cylinder 426 or 436 of the inner and outer lift assist actuators 382*a* and 382*b*. Alternatively, the bypass circuit 462 includes a bypass line (not depicted) that establishes fluid communication between the base end chamber 424 or 444 and the respective pressurization line 422 or 438 of the respective hydraulic cylinder 426 or 436. The bypass circuit 462 may be coupled to a check valve 464 such as a ball check valve (depicted) or a elastomeric flapper check valve to enable flow through the bypass circuit 462 in only an outward direction. The bypass circuit 462 is arranged to be in fluid communication with the base end chamber 424, 444 of the hydraulic cylinder 426, 436 only when the ram of the hydraulic cylinder 426, 436 is fully extended (i.e., when piston 446, 448 is fully to the right in FIG. 18A, 18B). That is, when in the fully extended configuration, a seal 468 of the piston 446, 448 is disposed between bypass circuit 462 and the ram end 172, 316 of the hydraulic cylinder 446, 448. In the depicted embodiment, even though the piston 446 or 448 is adjacent the bypass circuit 462, hydraulic fluid can flow past the piston 446, 448 and into the base end chamber 424, 444 because the seal 468 is not between the bypass circuit 462 and the base end chamber 424, 444.

Functionally, the rephasing circuit 460 enables hydraulic fluid on the base side of the respective piston 446, 448 to bypass the piston and exit the ram end port of the cylinder, providing a controlled leak of the respective base end chamber 424, 444 when in the fully extended configuration. (Note that the cross-sectional depiction of the hydraulic cylinders in FIGS. 18A and 18B represents a fully retracted configuration with the piston proximate the base end, whereas the enlarged inset of FIG. 19 represents the fully extended configuration, with the piston proximate the ram end 172, 316.)

The controlled leak enables the "rephasing" of the inner and outer lift assist actuators 328*a* and 328*b*. That is, due to system imperfections, not all of the fluid leaving or entering one of the ganged chambers 442 or 444 is equal to the fluid entering or leaving the other of the ganged chambers 444 or 442. For example, a leak in the piston seal of the inner lift assist actuator 382*a* would cause more hydraulic fluid to exit the ram end chamber 442 of the inner lift assist actuator 382*a* than is displaced by the piston 446. Accordingly, the outer lift assist assembly 88 would experience more stroke, as well as a greater rate of stroke, than the inner lift assist assembly 86 because of the excess fluid entering the base end chamber 444. Over time, such imperfections may cause an accumulation of stroke differential that may become significant. The rephasing circuit 460 mitigates the effect of imperfections by enabling excess fluid entering the base end chamber of a given lift assist actuator to bypass the piston, thus maintaining equal volumetric displacement (and equal stroke lengths and rates) between the lift assist actuators. The controlled leak also enables initial filling of the base end chamber 444 of the outer lift assist actuator 382b.

The synchronization and phasing between the lift assist actuators 382a and 382b of the lift assist assemblies 86 and 88 prevent undue stresses to the wing sections and hinge assemblies during the lifting and lowering operations by assuring that there is little or no differential elevation between the mounting racks 376 of the lift assist assemblies 86 and 88 that would introduce such stresses.

Functionally, the first and second lateral actuators 166 and 312 apply lateral forces that impose moments 472 and 474 about the first and second hinge axes 164 and 304, respectively. Application of these moments serve a dual purpose. When the tool bar assembly 80 is in the extended configuration 34 and is lowered for engagement of the ground tools 92, the first and second lateral actuators 166 and 312 can be actuated to extend, thereby exerting a lateral expansion force that generates "downward" moments (i.e., counterclockwise in FIG. 8) about the first and second hinge axes 164 and 304 to distribute down forces on the wing sections 112 and 114. The down forces provide desired penetration of the soil. For actuators that implement hydraulic cylinders, hydraulic pressure can be maintained to provide an even down force, regardless of the topography of the terrain and the subsequent rotational orientation of the wing sections with respect to each other.

When the tool bar assembly 80 is in the extended configuration 34 but is raised for disengagement of the ground tools 92, it is often desirable to at least partially relieve the lift assist assemblies 86 and 88 of the weight of the pivotable wing 82 (e.g., to reduce drag and the stresses associated with making a turn at a head row). Accordingly, the first and second lateral actuators 166 and 312 can be actuated to retract, thereby exerting a lateral retraction force that generates "upward" moments (i.e., clockwise in FIG. 8) about the first and second hinge axes 164 and 304 to exert upward forces on the wing sections 112 and 114. The up forces act to essentially "stiffen" the pivotable wing 82, so that when the first lateral actuator 166 exerts an up lift force on the inner wing section 112, the pivotable wing 82 doesn't excessively flex about the second hinge axis 304. The upward force reduces the weight on each of the lift assist assemblies 86 and 88 and transfers that weight to the carriage 38 via the tool bar assembly 80. A portion of the weight transferred to the carriage 38 is carried by the track system 48 (or tires 52), while the remaining portion is transferred to the tractor via the tongue 54. In the depicted embodiments, the lift assist assemblies 86 and 88 remain in contact with the ground surface to provide partial support to the wing sections 112 and 114.

It is also contemplated that the up force may be utilized to relieve the lift assist assemblies 86 and 88 of weight in the retracted configuration 36. That is, because the first and second hinge assemblies 162 and 302 are operational in the retracted configuration 36, the up force can be applied to the first and second lateral actuators 166 and 312 with the same effect. The reduced weight to the lift assist assemblies 86 and 88 may reduce the forces required to maintain the pivotable wings 82 in the retracted configuration 36 during transport of the agricultural implement 30.

The disclosed embodiment depicts the first and second lateral actuators 166 and 312 as dual action actuators to affect both the up forces and the down forces in operation. In an alternative embodiment (not depicted), the first and second lateral actuators 166 and 312 are configured only as lift actuators, with additional actuators provided to supply the down forces. In such embodiments, two actuators (a lift actuator and a down force actuator) would bridge each of the first and second hinge assemblies 162 and 302. In yet another alternative embodiment (not depicted), the first and second lateral actuators 166 and 312 are configured only as lift actuators, with the tool bar assembly 80 relying on the weight of the inner and mid wing sections 112 and 114, or supplemental weights placed thereon, to provide the necessary down force for working the soil.

The arrangement of the third lateral actuator 336 and yoke assembly 338 enables the outer wing section 116 to fold over onto the mid wing section 114 in the retracted configuration 36, and to deploy the outer wing section 116 from the retracted configuration 36 to the extended configuration 34. In various embodiments, a standoff 381 extends above the mid wing section 114 and is arranged to engage the outer wing section 116 when in the retracted configuration 36. In some embodiments, the third lateral actuator 336 can also be implemented to exert additional down force on the outer wing section 116 (such as described above attendant to the discussion of FIGS. 15 through 17) and/or raise or "kick" the outer wing section 116 up when actuation is reversed.

Figure 21:
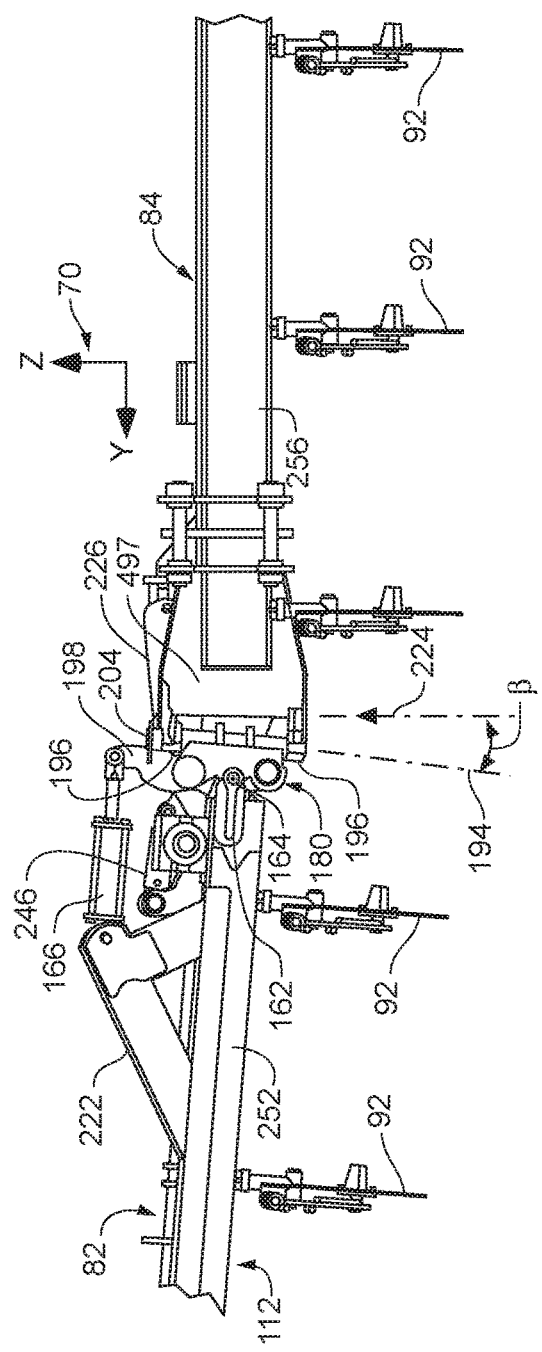
FIG. 21 is an elevational view of the angled hinge bracket of FIG. 20 in assembly with the tool bar assembly in the extended configuration in assembly in an embodiment of the disclosure.
Figure 20:
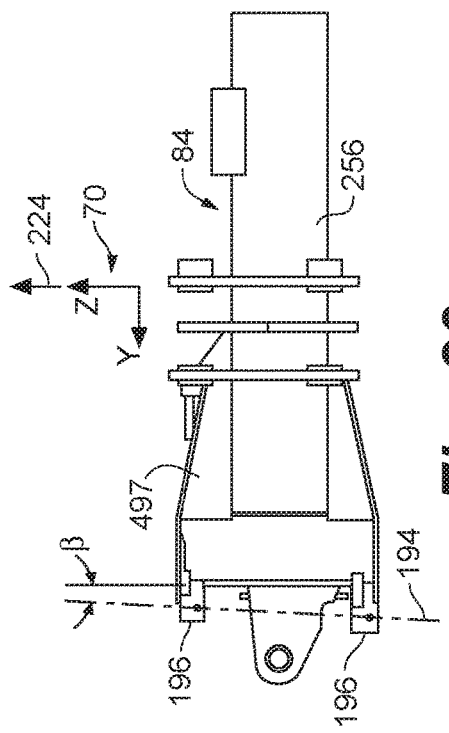
FIG. 20 is an elevational view of an angled hinge bracket in isolation in an embodiment of the disclosure.
Figure 22:
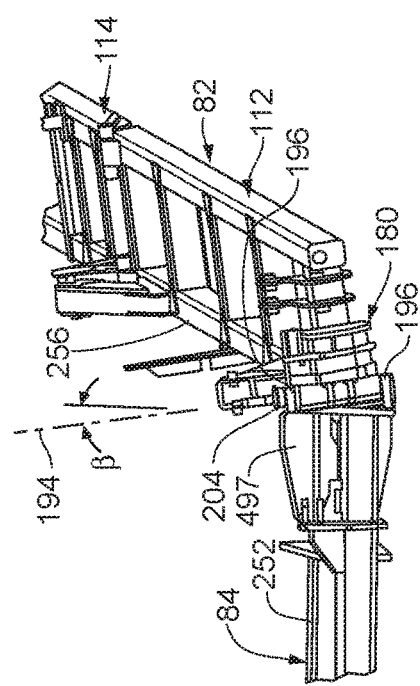
FIG. 22 is a perspective view of the angled hinge bracket of FIG. 20 in assembly with the tool bar assembly in the extended configuration in assembly in an embodiment of the disclosure.

Referring to FIGS. 20 through 22, an angled hinge bracket 497 mounted to the mounting beam 256 of the center section 84 and its effect are described in an embodiment of the disclosure. The hinge collars 196 of the angled hinge bracket 497 are arranged so that the pivot axis 194 of the hinge dowel 192 (FIGS. 5 and 6) is canted at an angle $\beta$ with respect to the vertical upward direction 224, but is still on a plane that is orthogonal to the forward direction 56. In various embodiments, the pivot axis 194 is defined as parallel to the y-z plane of the Cartesian coordinate system 70, and slopes inward (toward the centerline 85 of the agricultural implement 30) in the upward direction 224. In some embodiments, the angle $\beta$ is within a range of 1 degree to 10 degrees inclusive; in some embodiments, within a range of 2 degrees to 8 degrees inclusive; in some embodiments, within a range of 2 degrees to 5 degrees inclusive. Herein, a range that is said to be "inclusive" includes the stated limits of the range in addition to all values between those limits.

Functionally, the canted arrangement of the angled hinge bracket 497 imparts a rotation about the longitudinal axis 253 of the pivoting beam 252 when the pivotable wing 82 is pivoted from the extended or field configuration 34 to the retracted or transport configuration 36. For illustrative effect, the angled hinge bracket 497 is depicted in FIG. 20 as imparting an upward lateral incline as the pivoting beam 252 extends away from the angled hinge bracket 497. However, the upward incline of the pivoting beam 252 when the pivotable wing 82 is in the extended configuration 34 is of marginal significance, as it can be effectively eliminated when in the extended configuration 34. The flexibility about the first hinge axis 164 provided by the first hinge assembly 162 and the adjustment about the first hinge axis 164 provided by the first lateral actuator 166 compensates not only for the incline relative to the terrain, but also compensates out the upward incline of the pivoting beam 252 that would otherwise be imposed by the angled hinge bracket 497. The leveling of the pivoting beam 252 also restores the allowance angle α to a nominal design value by aligning the inner wing section 112 with the center section 84, as depicted in FIG. 11.

Referring to FIGS. 23 through 26, the effect of a non-canted pivot axis versus a canted pivot axis on the agricultural implement 30 in the transport or retracted configuration 36 is illustrated in embodiments of the disclosure. In FIG. 23, the pivotable wing 82 is presented in partial assembly, depicting the center section 84, inner wing section 112, mid wing section 114, and outer wing section 116 in the retracted configuration 36. A wire frame schematic 482 is overlaid onto pivotable wing 82 in FIG. 23, depicted in isolation in FIG. 24. The wire frame schematic 482 includes wire frame representations of a center section 484, inner wing section 512 and mid wing section 514, as well as wire frame schematic representations 528, 532, and 534 of the forward beams 128, rearward beams 132, and cross members 134, respectively of the inner wing and mid wing sections 112 and 114. The wire frame schematic 482 also includes a wire frame representation of the pivot assembly 180, referred to as pivot assembly 580. The wire frame schematic 482 also represents the hinge members 302*a* and 302*b* with nodes 502*a* and 502*b*. Below, the corresponding components of the wire frame schematic are indicated in parentheses.

Also presented in FIG. 24 is the pivot axis 194, the longitudinal axis 253, and the lateral axis 257. The pivot axis 194 and lateral axis 257 define a plane 594. For embodiments where the tool bar assembly 80 is configured to define the pitch angle φ, the pivot assembly 180 may be mounted to be offset from vertical by an equal angle φ. Because the plane 594 conforms to the orientation of the pivot axis 194, such embodiments will cause the plane 594 to also pitch by an angle φ relative to vertical. The pitch angle φ relative to vertical is depicted in FIG. 24.

For embodiments where the pivot axis 194 is vertical, the plane 594 is parallel to the y-z plane of the Cartesian coordinate system 70 and orthogonal to the towing direction 56. Such an arrangement is depicted in FIGS. 25 and 26 to more clearly illustrate the effect of the canted angle β. The pivot axis 194, longitudinal axis 253, lateral axis 257, and plane 594 are also superimposed onto FIGS. 25 and 26. Also in the depicted embodiment, the longitudinal axis 253 and lateral axis 257 are defined so as to intersect the pivot axis 194.

The pivotable wing 82 is partially supported by lift assist assemblies 86 and 88. As discussed attendant to FIG. 13A, a moment M is imparted on the pivotable wing 82 because the sections 112 and 114 of the pivotable wing 82 are not centered over the base wheel assemblies 374 of the lift assist assemblies 86 and 88. The moment M can be taken about the longitudinal axis 253. The lift assist assemblies 86 and 88, being free to move along the ground, do not oppose the moment M. In fact, the lift assist assemblies 86 and 88, having a center of gravity that is substantially off center with respect to the wheel assemblies 374, actually contribute to the moment M. Furthermore, when in the transport configuration 36, the detachable beam 254 of the inner wing section 112 is decoupled from the mating beam 258 of the center section 84. Accordingly, in various embodiments, only the pivot assembly 180 counters the moment M when the pivotable wing 82 is in the transport configuration 36.

The moment M acts to twist the pivotable wing 82 (482) about the longitudinal axis 253. Structural deflection of the forward beams 128 (528), rearward beams 132 (532), and cross members 134 (534) of inner wing section 112 (512), mid wing section 114 (514), along with the play associated with the hinge members 302*a* and 302*b* (502*a* and 502*b*), causes rotational deflections of the pivotable wing 82 about the longitudinal axis 254. The rotational deflections are presented in FIGS. 25 and 26, which represents a non-deflected and substantially horizontal wire frame schematic 482' in phantom to comparatively illustrate the effect of the rotational deflections. The rotational deflections are particularly pronounced in the transport configuration 36, where the detachable beam 254 is not engaged with the center section 84 and thus does not provide additional countering of the moment M.

Note that the magnitude of the rotational deflection is cumulative from proximal to distal along the length of the inner and mid wing sections 112 (512) and 114 (514). That is, as depicted in FIGS. 25 and 26, the rotational deflection is less near the pivot assembly 580 than at regions distal to the pivot assembly 580. In the absence of a canted pivot axis, the rotational deflections δ1 and δ2 from horizontal are substantial at the locations of the lift assist assemblies 86 and 88. Accordingly, the pitching of the lift assist assemblies 86 and 88 may be pronounced, as depicted in FIG. 27.

The disclosed embodiments present a variety of ways to abate and/or compensate for the moment M when in the transport configuration 36. Embodiments that implement the pitch angle φ of the dual beam structure 126 provide a degree of compensation against the twisting imposed by the moment M, because the pitch angle φ is in a direction about the longitudinal axis 253 that is opposite the direction of the moment M.

Alternatively or in addition, the angled hinge bracket 497 of FIG. 20 providing the canted angle β of the pivot axis 194 can be implemented to at least partially compensate for the rotational deflection of the pivotable wing 82 in the transport configuration 36, as illustrated in FIG. 28. It is noted that the canted angle β is defined in the plane 594. While the canted angle β causes the inner frame section 112 to be rotationally offset with respect to horizontal near the pivot assembly 180 (580), the rotational deflections δ1' and δ2' at the locations of the lift assist assemblies 86 and 88, respectively, are substantially reduced compared to the rotational deflections δ1 and δ2 of the vertical pivot axis (FIG. 25).

In the depicted embodiment, the offset angle β causes the rotational deflections δ1' and δ2' to be divided evenly between the first and second lift assist assemblies 86 and 88. That is, the rotational deflections δ1' and δ2' are of substantially equal magnitude but opposite direction, with the rotational deflection δ1' sloping upwards and rotational deflection δ2' sloping downwards. Other arrangements are contemplated, where both rotational deflections δ1' and δ2' slope downwards or upwards, or where one of the rotational deflections δ1' or δ2' is substantially zero with the other of the rotational deflections δ2' or δ1' sloping downwards or upwards.

Functionally, imposition of the canted angle β by the angled hinge bracket 497 at least partially offsets the rotational deflection of the inner and mid wing sections 112 and 114 at the locations of the lift assist assemblies 86 and 88. Thus, the wheel assemblies 374 of the lift assist assemblies 86 and/or 88 more closely approximate a true upright position when in the transport configuration 36. Having the wheel assemblies 374 being closer to upright provides better control at the relatively high speeds encountered during transport. In addition, the side loads on the bearings of the wheel assemblies 374 are reduced, extending the life of the bearings. Also, tread wear of the tires of the wheel assemblies 374 is more uniform and also reduced, as the load is spread over a broader portion of the tread.

Also, the moment M can be reduced by implementing a linkage configuration that draws the wheel assembly 374 closer to the pivotable wing 82, as discussed attendant to FIG. 13A. Furthermore, the linkage arrangement of schematic 380, with the upper linkage 378a being longer that lower linkage 378b, orients the lift assist assembly 371 to "lean away" from the rotational direction of the moment M, to at least partially compensate for the twisting of the pivotable wing 82. The compensation causes the lift assist assembly 371 to be closer to an upright position in the deflected state.

What is claimed is:

1. A tool bar assembly for an agricultural implement that is configurable in a field configuration and a transport configuration, the tool bar comprising:
    a center section defining a lateral axis that is perpendicular to a towing direction of said agricultural implement;
    an inner wing section including a proximal end and a distal end;
    a mid wing section including a proximal end and a distal end;
    a first hinge assembly that bridges said center section and said proximal end of said inner wing section, said first hinge assembly defining a first hinge axis that is substantially horizontal in said field configuration;
    a second hinge assembly that bridges said distal end of said inner wing section and said proximal end of said mid wing section, said second hinge assembly defining a second hinge axis that is substantially horizontal in said field configuration; and
    a first lift assist assembly and a second lift assist assembly that support said tool bar assembly proximate opposing ends of said mid wing section, each configured to vertically displace said mid wing section,
    wherein said first lift assist assembly includes a first hydraulic lift assist actuator defining a base end chamber and said second lift assist assembly includes a second hydraulic lift assist actuator defining a ram end chamber, said base end chamber being in fluid communication with said ram end chamber, and
    wherein an effective area of said base end chamber is equal to an effective area of said ram end chamber.

2. The tool bar assembly of claim 1, wherein:
    said first lift assist assembly is an inner lift assist assembly that supports said tool bar assembly proximate said distal end of said inner wing section; and
    said second lift assist assembly is an outer lift assist assembly that supports said tool bar assembly proximate a distal end of said mid wing section.

3. The tool bar assembly of claim 1, wherein said center section and said inner wing section are configured to limit downward rotation of said inner wing section relative to said center section about said first hinge axis within a range of rotation not to exceed 20 degrees with respect to a nominal rotational orientation about said first hinge axis.

4. The tool bar assembly of claim 1, wherein said inner wing section and said mid wing section are configured to limit downward rotation of said mid wing section relative to said inner wing section about said second hinge axis within a range of rotation not to exceed 20 degrees with respect to a nominal rotational orientation about said second hinge axis.

5. The tool bar assembly of claim 1, comprising:
    a first lateral actuator that bridges said center section and said proximal end of said inner wing section for articulation of said inner wing section relative to said center section about said first hinge axis, said first lateral actuator being configured to selectively exert an up force on said inner wing section relative to said center section and about said first hinge axis to stiffen said tool bar assembly; and
    a second lateral actuator that bridges said distal end of said inner wing section and said proximal end of said mid wing section for articulation of said mid wing section relative to said inner wing section about said second hinge axis, said second lateral actuator being configured to selectively exert an up force on said mid wing section relative to said inner wing section and about said second hinge axis to stiffen said tool bar assembly.

6. The tool bar assembly of claim 5, wherein said first lateral actuator is a dual action actuator.

7. The tool bar assembly of claim 5, wherein said second lateral actuator is a dual action actuator.

8. The tool bar assembly of claim 1, comprising:
    an outer wing section including a proximal end and a distal end;
    a third hinge assembly that bridges said proximal end of said outer wing section and said distal end of said mid wing section, said third hinge assembly defining a third hinge axis that is substantially horizontal in said field configuration, said mid wing section and said outer wing section being configured for rotation of said outer wing section relative to said mid wing section about said first hinge axis in a range of rotation that does not exceed 20 degrees in a downward direction and 170 degrees in an upward direction from a nominal rotational orientation; and
    a third lateral actuator that bridges said distal end of said mid wing section and said proximal end of said outer wing section for articulation of said outer wing section relative to said mid wing section about said third hinge axis.

9. The tool bar assembly of claim 1, wherein the first hydraulic lift assist actuator and the second hydraulic lift assist actuator are dual acting.

10. The tool bar assembly of claim 9, comprising means for rephasing the dual acting hydraulic actuators of said first lift assist assembly and said second lift assist assembly.

11. A tool bar assembly for an agricultural implement that is configurable in a field configuration and a transport configuration, the tool bar assembly comprising:
    a center section defining a lateral axis that is perpendicular to a towing direction of said agricultural implement;
    a pivot assembly mounted to said center section and defining a canted pivot axis that is canted at an angle with respect to a vertical upward direction to slope toward a centerline of said center section in said vertical upward direction, said centerline being parallel to a direction of travel of the agricultural implement; and
    a foldable wing pivotally mounted to said pivot assembly for rotation of said foldable wing about said canted pivot axis from the field configuration into the transport configuration, said foldable wing defining a longitudinal axis that extends parallel to said lateral axis of said center section when in the field configuration and that extends rearward of said center section when in the transport configuration, said longitudinal axis being defined as intersecting said canted pivot axis,
    wherein rotation of said foldable wing about said canted pivot axis causes said foldable wing to rotate about said longitudinal axis.

12. The tool bar assembly of claim 11, wherein said foldable wing comprises:
- a first wing section including a proximal end and a distal end, said first wing section extending along said longitudinal axis, said proximal end being pivotally mounted to said pivot assembly;
- a first hinge assembly that bridges said pivot assembly and said proximal end of said first wing section, said first hinge assembly defining a first hinge axis that is substantially horizontal in the field configuration and canted relative to horizontal in the transport configuration;
- a second wing section including a proximal end and a distal end, said second wing section extending along said longitudinal axis; and
- a second hinge assembly that bridges said distal end of said first wing section and said proximal end of said second wing section, said second hinge assembly defining a second hinge axis that is substantially horizontal in the field configuration and canted relative to horizontal in the transport configuration, said second wing section extending along said longitudinal axis of said first wing section.

13. The tool bar assembly of claim 11, wherein said angle is in a range of 1 degree to 10 degrees inclusive.

14. A method of operating a hydraulic system for a tool bar assembly of an agricultural implement that is configurable in a field down force configuration, a field lift assist configuration, and a transport configuration, comprising:
- providing a hydraulic system, including:
  - a first lateral hydraulic actuator defining a first base end chamber and a first ram end chamber;
  - a first base end accumulator coupled to said first base end chamber of said first lateral hydraulic actuator;
  - a first ram end accumulator coupled to said first ram end chamber of said first lateral hydraulic actuator;
  - a second lateral hydraulic actuator defining a second base end chamber and a second ram end chamber; and
  - a rerouting valve in fluid communication with said first base end chamber, said first ram end chamber, said second base end chamber, and said second ram end chamber,
- wherein:
  - in the field down force configuration, said second ram end chamber of said second lateral hydraulic actuator is coupled with said first base end chamber of said first lateral hydraulic actuator and said first base end accumulator via said rerouting valve, said second base end chamber being in fluid communication with a hydraulic pressurization line, said first ram end chamber being in fluid communication with a return line; and
  - in the field lift assist configuration and the transport configuration, said second ram end chamber of said second lateral hydraulic actuator is coupled with said first ram end chamber of said first lateral hydraulic actuator and said first ram end accumulator via said rerouting valve, said first ram end chamber being in fluid communication with said hydraulic pressurization line, said second ram end chamber being in fluid communication with said hydraulic pressurization line via said rerouting valve, said first base end chamber and said second base end chamber being in fluid communication with said return line.

15. The method of claim 14, wherein a second base end accumulator is coupled to said first base end chamber of said first lateral hydraulic actuator in the step of providing said hydraulic system.

16. The method of claim 14, comprising:
- configuring the hydraulic system in the field down force configuration; and
- placing said pressurization line in fluid communication with a hydraulic pressure source to pressurize said second base end chamber of said second lateral hydraulic actuator, the pressurizing of said second base end chamber causing displacement of hydraulic fluid from said second ram end chamber to pressurize said first ram end chamber of said first lateral hydraulic actuator, the pressurizing of said first base end chamber causing displacement of hydraulic fluid from said first ram end chamber to displace fluid in said return line.

17. The method of claim 14, comprising:
- configuring the hydraulic system in the field lift assist configuration; and
- placing said pressurization line in fluid communication with a hydraulic pressure source to pressurize said first ram end chamber of said first lateral hydraulic actuator and said second ram end chamber of said second lateral hydraulic actuator, said second ram end chamber being pressurized via said rerouting valve, the pressurizing of said first ram end chamber and said second ram end chamber causing displacement of hydraulic fluid from said first base end chamber and said second base end chamber, respectively, to displace fluid in said return line.

18. The method of claim 17, comprising:
- closing said pressurization line and said return line after the step of placing said pressurization line in fluid communication with said hydraulic pressure source, thereby configuring the hydraulic system for the transport configuration.

* * * * *